July 1, 1969

T. S. STAFFORD ET AL 3,453,600

PROGRAM SUSPENSION SYSTEM

Filed Aug. 18, 1966

INPUT-OUTPUT ROUTINE WITH HOUSEKEEPING OPERATIONS

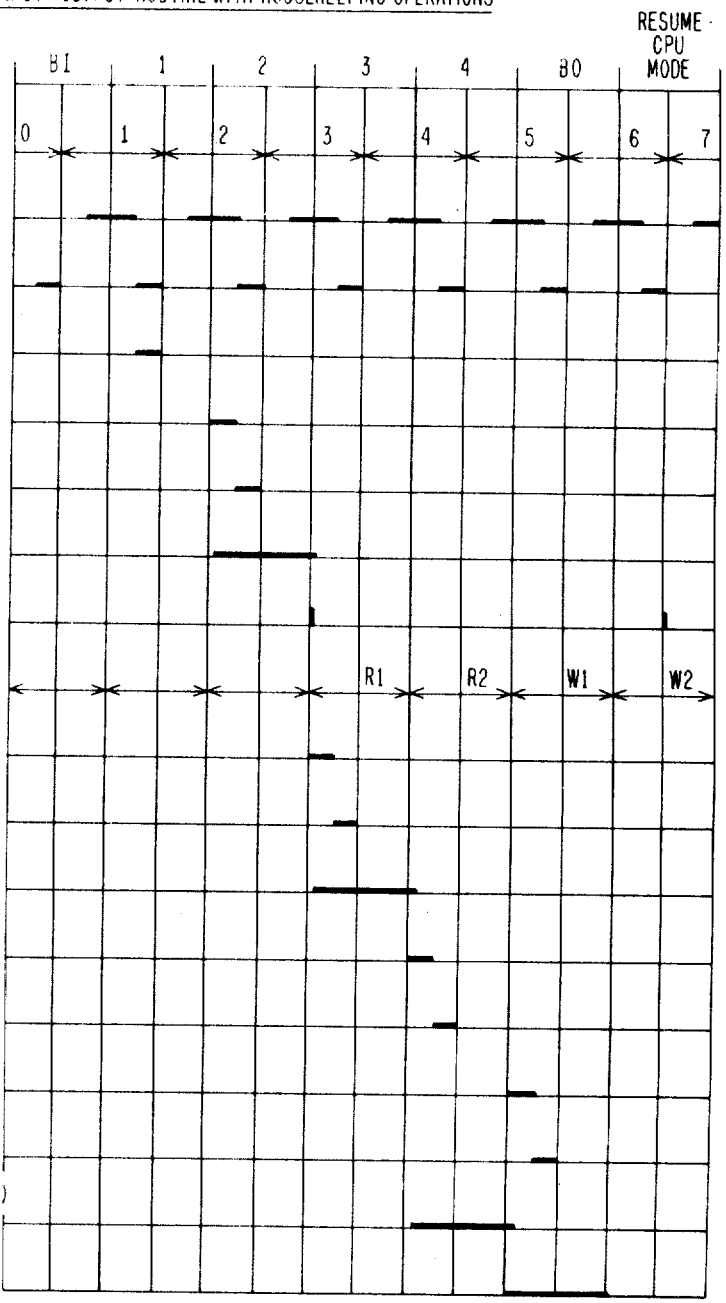

EVENTS
1. CPU CYCLES
2. LS MEMORY CYCLES
3. LS READ CYCLES
4. LS WRITE CYCLES
5. WRITE ($R \rightarrow LS_R$)
6. READ ($LS_{DA} \rightarrow R$)
7. WRITE ($L \rightarrow LS_{DA}$)
8. INCREMENT ADDRESS ($R \& 1 \rightarrow SAR \& L$ VIA ADDERS)
9. START MS
10. MS CYCLES
11. READ ($LS_C \rightarrow R$)
12. WRITE ($L \rightarrow LS_C$) (INCREMENTE ADDRESS)
13. DECREMENT COUNT ($R-1 \rightarrow L$ VIA ADDRESS)
14. READ ($LS_C \rightarrow R$) (INCREMENTED ADDRESS TO R)
15. WRITE ($L \rightarrow LS_C$) (DECREMENTED COUNT TO $LS_C$)
16. READ ($LS_{DA} \rightarrow L$) (RESTORE INITIAL STATE OF L)
17. WRITE ($R \rightarrow LS_{DA}$) (INCREMENTED ADDRESS TO $LS_{DA}$)
18. DATA TRANSFER TIME
19. BREAK-OUT LEGEND:
L = L REG
R = R REG
LS = LOCAL STORE
$LS_R$ = BACK UP FOR R REG IN LS (ONE FOR ALL CHANNELS)
$LS_{DA}$ = DATA ADDRESS POSITION IN LS (ONE PER CHANNEL: DENOTES MS ADDRESS)
$LS_C$ = WORD COUNT POSITION IN LS (ONE PER CHANNEL: INDICATES NO. OF WORDS YET TO BE PROCESSED BETWEEN CHANNEL AND MS)

3,453,600
Patented July 1, 1969

3,453,600
PROGRAM SUSPENSION SYSTEM
Thomas S. Stafford and Matthew A. Krygowski, Wappingers Falls, N.Y., assignors to International Business Machines Corporation, Armonk, N.Y., a corporation of New York
Filed Aug. 18, 1966, Ser. No. 573,246
Int. Cl. G11b 13/00
U.S. Cl. 340—172.5
22 Claims

ABSTRACT OF THE DISCLOSURE

A data processing system including a central processing unit, an input-output system, a controller coupled to the central processing unit and the input-output system for operating the data processing system, the controller including provision for performing a program interrupt or suspension of processing by the central processing unit for the purpose of exchanging data in either direction between the central processing unit and the input-output system, the interrupt being initiated forthwith by forcing a given code into a control register, the data exchange being executed under the supervision of control words, the control words being updated simultaneously with each data exchange, and all registers of the central processing unit being maintained intact except for two registers which are cleared during the interrupt.

CROSS-REFERENCES TO RELATED APPLICATIONS (1) Application Ser. 357,369 for Automatic Channel Apparatus filed on Apr. 6, 1964 by L. E. King and assigned to the assignee of this invention.

(2) Application Ser. 357,372 for Data Processing System by G. M. Amdahl et al., filed Apr. 6, 1964 and assigned to the assignee of this invention.

(3) Application Ser. 486,326 for Variable Priority Access Systems filed Sept. 10, 1965 by Peter N. Crockett et al., and assigned to the assignee of this invention.

BACKGROUND OF THE INVENTION (1) This invention relates to data processing systems and more particularly to such systems where input-output equipment interrupts or suspends processing by a central processing unit for the purpose of transferring or receiving data.

(2) In data processing systems the overall speed with which raw data may be processed into final form depends on a smooth flow of raw data into the system as well as a smooth flow of finalized data from the system. To the extent that the input-output system or the central processing unit does not operate at an optimum level of performance when the system is busy, the efficiency of the overall system suffers, and the result is an increase in the time for processing data with a consequent increase in cost. It is an objective of this invention to provide for (1) improved efficiency of a data processing system by reducing to a minimum the time required to execute data transfers between a central processing unit and an input-output system, (2) the utilization of the central processing unit to perform bookkeeping operations for the input-output equipment simultaneously as data transfers therebetween are executed, (3) the chaining of input-output data transfer requests without interruption to the maximum extent possible, (4) the simplification of the control functions for more readily changing the status of the central processing unit from internal processing operations (CPU MODE) to the status for an input-output data transfer (IO MODE) or vice versa, as the case may be, thereby minimizing the period of time during which the central processing unit and the input-output system both are not performing their assigned primary functions. These and other features of this invention are explained more fully hereinafter.

SUMMARY OF THE INVENTION

This invention is directed to a data processing system which includes a central processing unit (CPU and an input-output (IO) system which supplies data to the central processing unit and receives data therefrom. The data processing system is operated by microinstructions obtained from a read only store. When the central processing unit processes internal data, it operates in the CPU MODE. The input-output system includes one or more data paths with buffering termed Channels, and a plurality of input-output devices may be connected to each channel. When a data transfer is made between a channel and the central processing unit, the processing routine of the central processing unit is suspended while the channel is serviced, i.e. data is transferred from the channel to the central processing unit or data is transferred from the central processing unit to the channel. When processing by the central processing unit is suspended for an input-output data transfer, the central processing unit operates in the IO MODE. When the input-output device has been serviced, the program suspension is vacated, and the central processing unit changes back to the CPU MODE and continues its internal processing operations. The central processing unit executes instructions, and the Channel Units execute commands. Instruction execution by the central processing unit and command execution by the channel units usually proceed concurrently.

In one arrangement according to this invention the channel units receive commands by fetching a series of Channel Command Words (CCW's) from a main store in the central processing unit. A series of CCW's thereby specify a command program for the channel just as a series of instructions represent an internal program for the central processing unit (CPU). Initiation of the CCW fetching procedure is started by the CPU by means of an IO subset of instructions. The IO subset of instructions include: START IO, HALT IO, TEST CHANNEL and TEST IO. Channels may execute six basic commands: READ, WRITE, READ BACKWARD, CONTROL, SENSE AND TRANSFER-IN CHANNEL (TIC). READ commands involve conveyance of information from IO apparatus to the main store. WRITE commands operate to transfer information from the main store to IO apparatus. CONTROL is used to control IO apparatus; for example, to initiate tape rewind. SENSE causes the channel to transfer status data about IO apparatus from such devices to the main store for use by the CPU. TIC is the program mechanism for chaining CCW's in non-adjacent main storage locations into one continuous command program for the IO apparatus.

The system of this invention may include a basic multiplexer channel, where all IO devices are multiplexed, and up to three optional selector channels, where the IO device on each channel individually must be selected. Selected channels exchange bytes with IO equipment, where a byte consists of eight intelligence bits and one parity bit, and words with the main store of the central processing unit, where a word consists of four bytes or thirty-six bits. The multiplexer channel exchanges bytes with both the main store and other IO apparatus. The main store handles information in parallel word units. Hence in any data transfer between the multiplex channel and the main store, a full word is processed out of the main store, but only a byte portion of the word is addressed for further handling.

All data transfer paths between the main store and the channel include components of the CPU. The controls for the gates in these paths are integral with the CPU controls. When controlling internal program processes, the CPU controls operate in the CPU MODE, and conversely, when controlling IO transfers between the main store and the IO channels, the CPU controls operate in the IO mode. The channels initiate IO routines relative to the main store by transmitting Routine Request signals to the CPU. The CPU responds by issuing a Routine Received signal in the particular CPU cycle in which the request is selected for processing, and the CPU issues a Data Transfer or Control (DTC) signal in a late cycle to synchronize the channel to the CPU in order to complete the actual transfer of information.

In order to switch between the CPU mode and the IO mode, the CPU controls do not execute formal interrupt or program suspension sub-routines as in ordinary program interrupts. Instead, they execute considerably shorter microprogram suspension (BREAK-IN) and recovery (BREAK-OUT) operations, each lasting only a single microinstruction cycle. BREAK-IN conditions the CPU controls and one CPU register (the R register) for IO MODE operation, and BREAK-OUT restores the controls and the same CPU register to the CPU MODE status (i.e., the status existing prior to the program suspension) for continuation of the CPU MODE operation from the point of suspension.

In the IO MODE the CPU controls execute short IO microprograms hereinafter denoted transfer routines or IO routines. In an routine intelligence is passed over all or a portion of a CPU circuit path extending between the main store and the channels, and concurrently certain housekeeping operations are selectively performed by the CPU controls. The latter operations are treated as channel functions which are performed by the CPU, thereby improving the system efficiency as the CPU would otherwise remain idle during the program suspension. Housekeeping characterizes such functions as: fetching, modification and restorage of Data Address words which designate main store addresses which are held in channel allocated Data Address locations of a local store in the CPU; and fetching, selective modification, testing and restorage of Byte Count words held in other specially allocated locations of the local store.

Since several channels are capable of operating concurrently, common priority circuits are provided for resolving conflicts resulting from simultaneous issuance of Routine Requests by plural channels. The common priority circuits generally are able to seize immediate control of the CPU to service a channel Routine Request in any CPU mode cycle except in one instance which is noted hereinafter.

Data exchanges between the main store in the CPU and the multiplexer channel always are executed through one fixed CPU route, but data exchanges between the main store and a selector channel are routed selectively over one of two predetermined CPU paths designated route A and route B by the common priority control circuits. Route A extends directly between the channels and a storage data register (SDR) of the main store, and it traverses an array of latches and an output bus associated with a CPU adder. Route B consists of two legs, leg 1 and leg 2, which are negotiated separately in two discrete and usually disjoint IO microprogram routines. Leg 1 of route B extends between the channels and a special location in the local store. Since the local store has a considerably shorter access cycle than the main store, this leg of route B is traversed in an IO routine of comparatively brief duration. The CPU components in this path include the CPU adder latches, a CPU adder outbus, and a CPU R register, the path terminating at either the special location in the local store when the transfer is inward, or a channel buffer when the transfer it outward. Leg 2 of route B extends between the special location in the local store and the main store, thereby traversing a set of CPU components including the R register, Adder Latches and the SDR of the main store.

The duration of the routine for transferring a word over the CPU route A is shorter than the combined durations of the two routines required to transfer the same word over the two legs of the CPU route B. However, the route A routine is considerably longer than the routine associated with leg 1 of route B since the latter requires neither access to the main store nor housekeeping operations. Thus the selection of route B routine ultimately extends or prolongs the IO MODE handling operation for the momentary time advantage of rapidly servicing concurrent or potentially conflicting IO routine requests. Transfers over the longer route, route B, are avoided whenever possible in the interest of the overall efficiency of the data processing system, but the choice does permit rapid servicing of IO device which might otherwise overrun instantaneously.

If the CPU is in the CPU MODE and a channel requests a data transfer, the CPU responds to the request by switching to the IO mode and issuing ROUTINE RECEIVED within a fraction of a CPU machine cycle. A CPU machine cycle is defined as the basic unit of time, and the basic operating cycle of all other components in a system are measured with respect to the basic CPU cycle which, in a preferred embodiment of this invention, is one-half microsecond in duration. For example, the memory cycle of the local store and the memory cycle of the read only store are each one CPU machine cycle in duration. The memory cycle of the main store, on the other hand, is equal in duration to four CPU machine cycles. There is a time lag of approximately one CPU cycle between the addressing of a microinstruction in the read only store and the appearance of the microinstruction at the output of the read only store. Therefore, each microinstruction in the read only store must be addressed approximately one cycle before it is actually needed at the output thereof. It would be wasteful of processor time and degrade channel performance to make use of a microinstruction from the read only store to control the transition of the CPU from the CPU MODE status to the IO MODE status if a channel request were delayed while a BREAK-IN microinstruction were obtained from the read only store in response to a channel request. In order to alleviate this undesirable situation, therefore, the CPU is provided with auxiliary-controls, separate and apart from the read only store which operate in a fraction of a CPU cycle to initiate BREAK-IN operations incident to each transition from the CPU MODE to the IO MODE upon receipt of a channel request. Upon selection of a ROUTINE REQUEST from a channel, the CPU controls act at the end of the current CPU cycle to: (1) condition a mode trigger from CPU MODE status to IO MODE status; (2) suppress the normal output of the read only store; (3) force a special BREAK-IN microinstruction code (all zeros) at the output of the read only store; (4) suppress the normal sequential input to the address register of the read only store; and (5) gate a new control address from the selected channel to the address register of the read only store, whereby the microinstruction for executing the Channel routine becomes available from the read only store as soon as the BREAK-IN microinstruction is executed. A CPU cycle in which the foregoing actions occur is characteristically termed a BREAK-IN cycle, and these events are all completed within a fraction of the cycle. Later in the same cycle the microinstruction code of all-zeros, substituted for the output of the read only store, is decoded to operate gates and the local store controls in order to store the content of a CPU buffer register (R register) in a special back up location (R BACK-UP) in the local store. With this last action the BREAK-IN cycle is completed, and the CPU controls are prepared to begin the transfer routine in the very next CPU cycle.

When the mode trigger is set to the IO MODE status in the BREAK-IN cycle, a gate between the address register of the read only store and another back-up register, termed ROAR BACK-UP is disabled. In each CPU MODE cycle this gate transfers the current control address from the address register of the read only store, termed ROAR, to the ROAR BACK-UP register. Thus the last CPU MODE entry to the ROAR before the transition to the IO MODE, which represents the address in the read only store of the word suppressed during the BREAK-IN cycle, is preserved in the ROAR back up, and it is made available for use in a later BREAK-OUT cycle to restore the proper address to the ROAR, thereby to start the read only store at the proper address required to continue the CPU MODE operation from the point where it was interrupted.

In one exceptional CPU MODE circumstance the gate between the ROAR and the ROAR BACK-UP register is disabled one cycle before the BREAK-IN cycle. In order to explain this exception it is necessary to note the relationship between the main store and the CPU. As pointed out earlier, the local store, the read only store and the CPU cycles are of equal duration, but the main store cycles are considerably longer. A main store cycle straddles four CPU cycles and begins with a signal denoted LOAD SAR which serves to advance the address information through the CPU adder and to enter the same into the address register of the main store (SAR). A total of two CPU cycles elapse between the addressing of the microinstruction containing the LOAD SAR field and the actual entry of the information into the SAR. Thus the address of the read only store word containing the undecoded LOAD SAR signal is preserved in the ROAR BACK-UP register one cycle prior to the handling of the address information and two cycles prior to the actual loading of SAR. Consequently, should a channel request be received in the cycle preceding an actual loading of the SAR, not only is it necessary to suppress the subsequent cycling of the main store, thereby to allow preference to be given to the channel request, but it is essential also that the associated LOAD SAR control address, initiated in the previous cycle, be retained in the ROAR BACK-UP register during the current cycle. For this purpose a special inhibitory control is exerted on the gates between the ROAR and ROAR BACK-UP register whenever the address register of the read only store hold the LOAD SAR field and a channel request is received, thereby preserving the next to last one of the CPU MODE control addresses in ROAR BACK-UP register rather than the usual last CPU MODE address.

Concerning the acceptance of Channel requests when the CPU is in the CPU MODE status, there is only one circumstance in which BREAK-IN is not started in the cycle immediately following the appearance of a channel request. In this special case it is delayed one additional CPU MODE cycle, and this is explained as follows. As indicated above a main store cycle straddles four CPU cycles and begins with LOAD SAR. Once the SAR is loaded and the main store begins its memory cycle, the action of the main store is irrevocable and proceeds to completion without interruption. On the other hand, CPU operations incidental to a main store operation are not affected if BREAK-IN occurs sufficiently late in the storage cycles. Specifically, if a channel request is selected in other than the first of the four CPU cycles straddled by a main store memory cycle, the subsequent BREAK-IN cycle coincides with the third or fourth quarter cycles of the memory cycle of the main store. It cannot in these instances interfere with the signal flow incidental to the main store operation. Conversely, a BREAK-IN cycle coincident with the second quarter of the memory cycle of the main store might interfere with the gating of signals into or out of the main store at the end of that memory cycle, thereby causing either the storage of incorrect information in the main store or suppression (i.e. wasting) of the output of the main store. For these reasons the circuits for issuing a ROUTINE RECEIVED signal in response to a channel request ignore channel requests presented in the first quarter of the memory cycle of the main store.

The BREAK-OUT microinstruction restores the CPU to the CPU MODE status by: (1) returning the local store R BACK-UP register content to the CPU R register, (2) returning the ROAR BACK-UP content to the ROAR, and (3) reversing the mode flip-flop to the CPU MODE status. If a channel request is received in the BREAK-OUT cycle, it is selected in that cycle, and in the very next CPU cycle a BREAK-IN action is started. Since no useful processing operations occur during BREAK-IN or BREAK-OUT, the occurrence of contiguous BREAK-OUT and BREAK-IN cycles represents a "worst case" situation of interference with ordinary CPU mode operations. In the "best case" situation contiguous channel routines occur without intervening BREAK-OUT or BREAK-IN cycles because each new request is received in the cycle preceding the addressing of the BREAK-OUT microinstruction, which is the next to last cycle of the IO MODE routine in progress. In the latter case the new channel control address is supplied to the ROAR, instead of the BREAK-OUT address which would otherwise be supplied to the ROAR, and the new routine begins immediately after the last cycle of the current routine, thereby eliminating completely both the BREAK-OUT and the BREAK-IN cycles. Where this occurs the IO routines are said to be "chained," and this represents the most efficient operation of the IO transfer porcess. Allowance is made for an "intermediate case" situation in which only a single "wasted" cycle is interposed between consecutive IO MODE routines, and this case occurs when a new Routine Request is received too late for continuous chaining without interruption but prior to the actual BREAK-OUT cycle i.e. in the last cycle of the current IO transfer routine. In the following cycle the decoded BREAK-OUT transfer from the ROAR BACK-UP to ROAR is blocked, and a new control address of the newly selected channel is forced into ROAR. Since the local store reads out nondestructively under the influence of the decoded BREAK-OUT microinstruction, the R back-up contents are automatically preserved. Hence, in effect a BREAK-OUT cycle is merged with a BREAK-IN cycle, and the new IO routine is separated from the preceding one by only a single CPU cycle. The contiguous IO routines may, and in general will be, servicing different channels.

In the IO MODE routines only a limited portion of the CPU is available for handling data. This portion includes the R register, Local Store, Adder, Logical Byte Mover, and certain data buses. Use of any CPU register other than the R register requires additional CPU control action to preserve the content of the other register in the local store. In order to do this without allocating additional back up registers in the local store and without adding extra cycles of transfer control activity for such locations, careful time shared use is made of special local store locations which normally hold the Channel Data Address and Byte Count words. The former words denote the current main store address assigned to the selected channel, and the latter words denote the number of bytes currently remaining to be handled in each respective channel. The locations of the Data Address and the Byte Count in the local store are used as back-up register buffer locations while the information normally resident therein is circulated through the CPU in connection with channel housekeeping operations. Since the housekeeping operations and the back-up transfers proceed concurrently, there are no extraneous cycles allocated to these functions in the CPU control for performing IO MODE routines. Consequently, housekeeping routines for the channels are performed during an IO MODE transfer by the CPU equipment thereby conserving channel hardware without requiring additional CPU equipment or additional memory cycles of the local store. The result is to improve the efficiency of the IO data transfers without any additional increase in time or equipment.

In addition to the foregoing features, it is another feature of this invention to provide an improved program suspension system which increases the efficiency of communicating data between an input-output system and a central processing unit of a data processing system by executing such transfers in a minimum period of time.

It is another feature of this invention to provide an improved program suspension system for executing data transfers between an input-output system and a central processing unit of a data processing system by concurrently performing housekeeping operations in the central processing unit simultaneously as the data transfers are executed.

It is another feature of this invention to provide an improved program suspension system for executing data transfers between an input-output system and a central processing unit of a data processing system by chaining contiguous IO requests, where possible, thereby to increase the efficiency of the data transfers by minimizing wasted time between IO routines.

It is a further feature of this invention to provide an improved program suspension system for executing data transfers between an input-output system and a central processing unit by performing housekeeping operations simultaneously as the data transfers are executed and performing the housekeeping operations in the central processing unit by allotting in the local store a back-up register for use by all channel data transfers which back-up register is used to hold the content of a vacated CPU register used for the housekeeping operations and utilizing as temporary buffer storage for other CPU registers specified registers in the local store which hold housekeeping data such as data storage address and word count.

It is one feature of this invention to provide IO BREAK-IN and IO BREAK-OUT circuits which provide fast access in and out of the CPU. During BREAK-IN the CPU R register is stored away, and during BREAK-OUT, the CPU R register is restored to its original state. Since this operation is done during the BREAK-IN and BREAK-OUT cycles, the CPU R register is free to be used by the CPU for performing housekeeping operations during the IO routine with no additional loss of time. Another CPU register, termed an L register, has its contents temporarily stored in a local store location vacated by the addressed information. Therefore, the L and R registers, in conjunction with local store locations briefly available while count and address information is temporarily extracted for updating purposes, provide sufficient storage capacity for performing housekeeping operations without requiring additional CPU registers or CPU cycles.

According to another feature of this invention the IO BREAK-IN and the IO BREAK-OUT circuits in conjunction with the priority circuits have the ability to chain routines from any channel together with routines of another channel with no loss of machine cycles, thereby executing more efficiently multiple IO MODE routines while eliminating BREAK-OUT and/or BREAK-IN cycles.

It is another feature of this invention to keep the IO routines short so that no channel may be held up for an extended period of time without having its request considered in the priority circuits, thereby assuring high transfer data rates to or from all channels by the CPU.

It is a further feature of this invention to accomplish IO BREAK-OUT by microprogramming which assures a smooth transition when returning control back to the CPU.

It is still a further feature of this invention to provide an improved program suspension system for executing data transfers between an input-output system and a central processing unit of a data processing system by reducing the time required to initiate an IO data transfer once the request has been received by forcing a given code, such as all zeros, in the output of the read only store in order to initiate the BREAK-IN routine in the next CPU cycle and transfer the channel address to the address register of the read only store thereby to make available the first microinstruction of the transfer routine immediately after the BREAK-IN cycle.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIGURE 11 is a timing chart which illustrates the occurrence of various events when housekeeping operations are performed simultaneously with an IO data transfer routine.

DESCRIPTION OF THE PREFERRED EMBODIMENT

Figure 1:
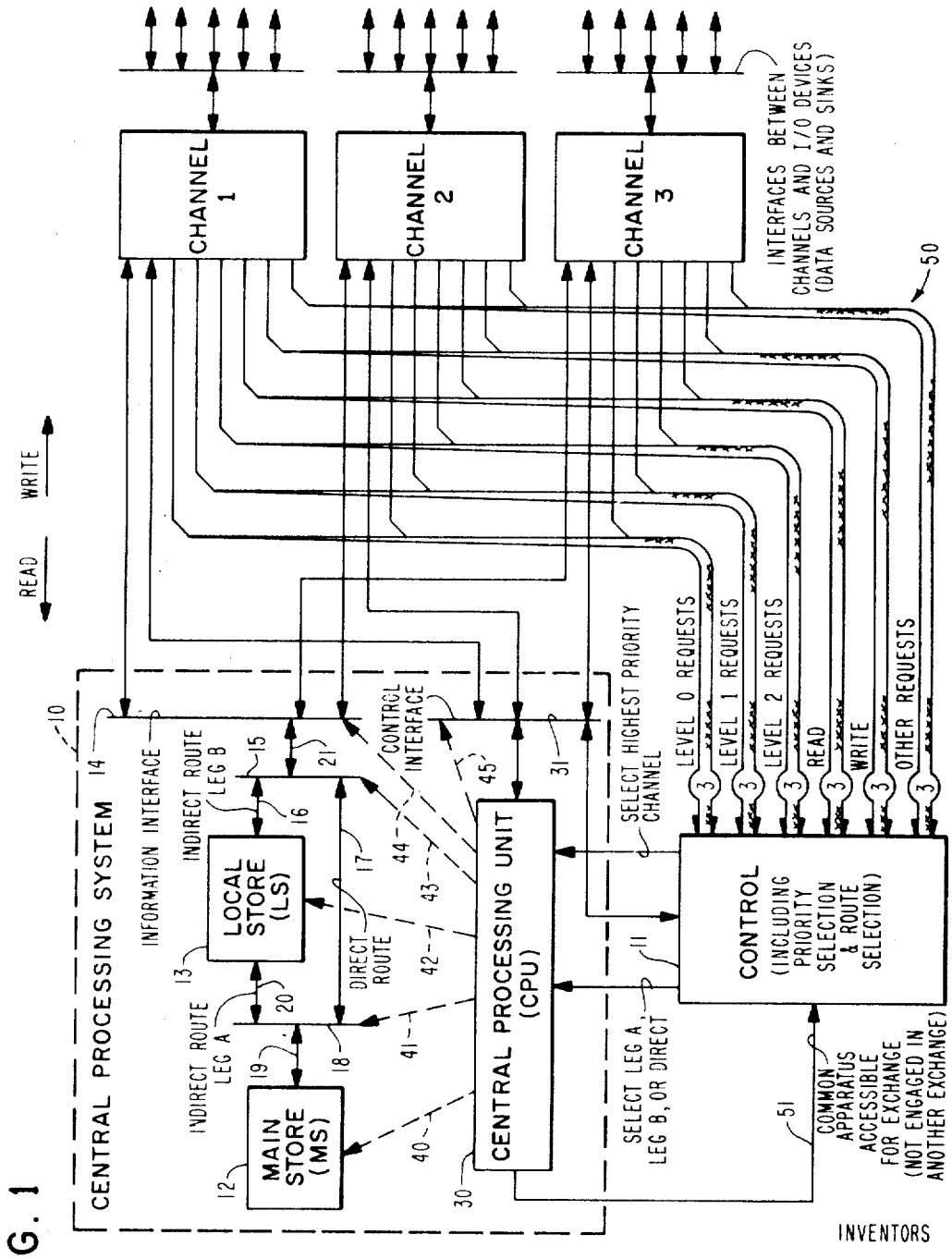
FIGURE 1 is a schematic block diagram of a particular embodiment of the invention as applied to exchanges of information between the main store of a central processing unit and an input-output system which includes a plurality of channel units in which the central controls are shared for the exchange function.

Reference is made to FIGURE 1 which illustrates in block form a system according to this invention which exchanges information between a central data processing system 10 and individual channel units designated as Channel 1, Channel 2, and Channel 3. It is understood that the number of channel units may be increased or diminished as desired. Control 11 coordinates the data flow between the central processing system 10 and the channel units. Control 11 performs priority selection and route selection as well as providing timing and control signals for manipulating data transfers from the central processing system 10 to the channels or from the channels to the central processing system.

The transfer of data from a channel to the central processing system is arbitrarily designated as a READ operation, and the transfer of information from the central processing system to a channel is arbitrarily designated as a WRITE operation. The common information exchange system through which the data moves between a given channel and either a main store (MS) 12 or a local store (LS) 13 is considered part of the central system, and it includes a first connecting link or information interface 14 which is coupled to a second connecting link or interface 15. The latter routes information from a channel along a path 16 to the local store 13 or along a path 17, a connection link or interface 18 and a path 19 to the main store 12. Information from the local store 13 may be supplied along a path 20, through the interface 18 and along the path 19 to the main store 12. Data transfers may be made in either direction through the connecting links or interfaces, and the data may move in either direction through the various paths as signified by the arrowheads at each end of the data paths.

A system of channel units intercommunicating with an internal memory of a processing system is disclosed in copending U.S. application Ser. No. 357,369 for Automatic Channel Apparatus filed by L. E. King et al. on Apr. 6, 1964 and assigned to the assignee of this invention. A system showing data transfers of channel units intercommunicating with either a local store or a main store in a CPU is illustrated and described in copending U.S. application Ser. No. 486,326 for Variable Priority Access Systems filed by Peter N. Crockett et al. on Sept. 10, 1965, now Patent No. 3,399,384 and assigned to the assignee of this invention. Both of said applications are referred to and incorporated herein and made a part hereof by this reference. As pointed out in the Crockett et al. application, the indirect route of data transfers from a channel to the main store 12 includes a transfer through the interface 14, a path 21, the interface 15, and the path 16, to the local store 13 where data is temporarily stored. Later data is transferred from the local store 13 along the path 20, the interface 18 and the path 19 to the main store 12. The direct route of data transfers from a given channel to the main store 12 includes the interface 14, the path 21, the interface 15, the path 17, the interface 18 and the path 19. The direct route is a faster route, overall, for transferring data from a given channel to the main store 12. Data transfers may proceed in the reverse direction along these routes.

The CPU 30 of the central processing system 10 includes the arithmetic and program instruction interpreting circuits and sequence controls required for the central processing function. The selecting and connecting link or interface 31 carries control information between the channels and both the central processing unit 30 and the control 11. The central processing unit controls all elements of the system 10 via control connections shown schematically at 40 through 45.

Implied at 40 are all of the controls required to initiate a cycle of operation of the main store 12 including the controls for selecting an address location within the main store and whether a read or write operation is to take place. A store operation is specified when new information is being entered into main store, and a fetch operation is specified if stored information is being nondestructively read from main store. Implied at 41 are the controls necessary to transfer information bidirectionally from the main store 12 along either the indirect route to the local store or the direct route to a channel. Implied at 42 are the controls required to initiate a cycle operation of the local store 13 including a selected address in the local store and whether a read or write operation is to be performed. Implied at 43 and 44 are the controls required to execute a transfer of information in either direction between a channel and either the path 16 or the path 17. Implied at 45 are the controls which govern the exchange of necessary control information between the central processing unit 30 and the channels, any one of which may be selected at a given instant to supply data along the route determined by the controls 44.

Priority and route decision is under the jurisdiction of the control 11. The control 11 receives request or demand signals from the channels via cables 50, and it receives availability signals from the CPU 30 via a line 51. While the system 10 is engaged in internal processing functions, the line 51 is constantly energized to indicate that the system 10 is continuously available for communication with a channel. Thus, as a general rule, the exchange of data between the channels and the central processing system takes precedence over internal processor functions.

During an exchange or transfer of a basic unit of information, such as a word, between the processor 10 and a channel, the line 51 is de-energized. Once the processing of a channel request is begun, it cannot be interrupted by another channel request. In this connection it is pointed out that for a READ or WRITE transfer operation, the processing of a channel request is done by a given basis IO routine, or microprogram, which provides all actions necessary to transfer a word between a selected channel and a selected location in one of the stores 12 or 13 or between selected locations in the stores 12 and 13. These routines are separated from, and should not be confused with, the composite routines which are made up of a series of basic IO routines by means of which entire messages are transferred between the internal stores and the channels. The basic IO routines are indivisible or non-interruptable once commenced; whereas, a series of basic routines constituting a composite routine need not, and in general are not, performed consecutively in time. Instead, they may be interleaved in time with basic routines of other channels or other internal processing routines of the system 10. Accordingly, it is seen why the line 51 is de-energized only while a basic IO routine involving a communication between one channel and the system 10 is in progress, and this line is re-energized as the terminal point of the basic IO routine is approached.

The system 10 operates cyclically in elemental cycles of half-microsecond duration to perform elemental (micro) operations of internal program instruction processing routines and basic channel intercommunication routines. Groups of consecutively executed elemental operations constitute a routine.

The process by which control word and program instruction intelligence is initially loaded into the main store 12 is generally the same as that disclosed on co-pending application Ser. No. 357,372 of G. M. Amdahl et al. filed Apr. 6, 1964 and assigned to the assignee of this invention. Reference is made to that application, and it is incorporated herein and made a part hereof.

With initial program and control word intelligence loaded into the main store 12, the system 10 is ready to undertake further information exchange and processing functions. At this point when an input-output device becomes available to deliver data to or receive data from the central processing system, a START IO procedure is executed by the system 10 to prepare the associated channel and the central processing unit 30 with status and control information appropriate for the contemplated exchange, including such items as initial data address which designates the initial location in the main store 12 which is to be addressed, a length count indicating the number of words to be transferred between the main store 12 and a given channel, information pertaining to identification and control of an input or output device, if necessary, and command information indicating to the channel what action is required of it. The START IO procedure is described in the above-mentioned Amdahl application. Channels may be directed to execute READ or WRITE type commands to transfer blocks of words between a given channel and a main store 12 or between an input or output device and a given channel. After a START IO operation is initiated, the central processing system 10 proceeds with its internal processing functions, and the channel proceeds independently to perform its assigned functions, thereby to execute its commands. The data processing system 10 refers to program instructions in the main store 12 for its control, and the channel refers to channel command words which it receives at appropriate times from the main store 12.

When a particular channel is executing a READ or WRITE type command it signals a READ or a WRITE access request from time to time to the common control 11 via one or more of the lines 50. If the central processing system 10 is engaged in internal processing functions at such time and no other channel has an active request, the central processing system 10 immediately (within one CPU cycle) discontinues or suspends the internal processing function and services the particular channel's request with a basic READ or WRITE routine. Thus the IO routine moves a unit of information between the main store 12 and an internal buffer of the particular channel; the IO routine moves a unit of information between the main store 12 and the local store 13; or the routine moves a unit of information between the local store 13 and the buffer of a particular channel. The IO routine is used also to increment the main store address and word count information of a channel control word whenever a data transfer is made to or from the main store 12. In order not to disturb the results of internal processing during interruptions by the basic IO routine operations, the direct and indirect routes described above are designed to use a minimum of the central processing system registers and circuits external to the main store 12 and the local store 13.

Prior to each basic IO routine the common control 11 selects a channed. If more than one channel is requesting service, only one channel is selected at a given instant of time, and it is selected in the manner explained in the Crockett et al. application. Once a given channel is accepted, the control 11 signals acceptance to the selected channel via control interface 31, and if the central processing system 10 is engaged in internal processing operations, the control 11 initiates the BREAK-IN action necessary to prepare the system to execute the basic routine. The selection by the control 11 of a request of a given channel is identified as ROUTINE RECEIVED. If the central processing system 10 is completing a previous basic routine when a ROUTINE RECEIVED takes place, no BREAK-IN preparation takes plase other than the placement of a new initial address in the program control apparatus, described more fully hereinafter. The new routine is merely chained to the previous routine without interruption therebetween.

The central processing system 10 has a basic cycle of operation, and with respect to this basic cycle of operation, an unchained basic routine requires (1) one CPU cycle for BREAK-IN, (2) a variable number of CPU cycles to transfer a word and update the main store address and length count information, and (3) a CPU cycle for BREAK-OUT which restores the central processing system to the same conditions which existed at the time BREAK-IN occurred. As explained more fully hereinafter, certain BREAK-IN or BREAK-OUT cycles may be eliminated, in chaining operations.

During or prior to data transfer and updating phases of each basic IO routine, the common control 11 receives certain information from the channel being serviced. This information determines the type of routine such as READ or WRITE, and this information in conjunction with other information normally determines whether the transfer route is the direct route or the indirect route. In some instances information from the channel is used exclusively to determine the transfer route.

The channel selected by the control 11 is the one having the highest instantaneous priority. Each channel may selectively produce requests on four different groups of lines which are denoted level 0, level 1, level 2 and level 3. Level 0 has the highest priority, and level 3 has the lowest priority. The precedence of levels 1 and 2 is intermediate that of levels 0 and 3 with level 1 having a higher priority than level 2. Different requests having the same level of priority are given precedence in the same order as the channel number. For example, if channels 1 and 2 make simultaneous requests on the same level of priority, channel 1 is selected first, and channel 2 is selected second. READ and WRITE requests are issued on levels 0, 1, or 2, but never on level 3. The lowest priority of level 3 is reserved for relatively less time dependent channel-processor communications.

The route selected by the control 11 depends upon many factors including the type of routine (read or write), the status of other channels (idle, in use, request, active), the status of information flow in the selected channel (local store and internal buffer occupancy), and certain other minor factors, as explained more fully in the Crocket et al. application.

*Additional background and explanatory information*

The central processing unit 10 and its sequence controls operate cyclically in one of two modes using one or more CPU machine cycles each of which is one-half microsecond in time duration. When internal processing operations are in progress in the central processing unit, its controls are conditioned to operate in a first mode designated the CPU MODE. When data is exchanged between the central processing system and a given channel, the CPU controls are conditioned to operate in a second mode termed the IO MODE. The controls of the CPU 30 are capable of reverting from CPU MODE to IO MODE operation within a fraction of a CPU cycle of operation. Likewise, the CPU controls are capable of reverting from the IO MODE of operation to the CPU MODE within a fraction of a CPU cycle of operation. A cycle in which a reversion takes place from a CPU MODE to an IO MODE is termed a BREAK-IN (BI) cycle. A cycle in which a reversion takes place from an IO MODE to a CPU MODE is termed a BREAK-OUT (BO) cycle. When the central processing unit 30 is operating in the CPU MODE, internal processing operations take place. When operating in the IO MODE, the central processing unit 30 is unavailable for performing internal processing operations, and it is therefore desirable to avoid any unnecessary prolongation of operations in the IO MODE since this interferes with or degrades the internal processing performance of the CPU. This invention provides a favorable balance between necessary extension of the time required for IO MODE operations and interference with the internal processing of the CPU.

*Main store*

Figure 2:
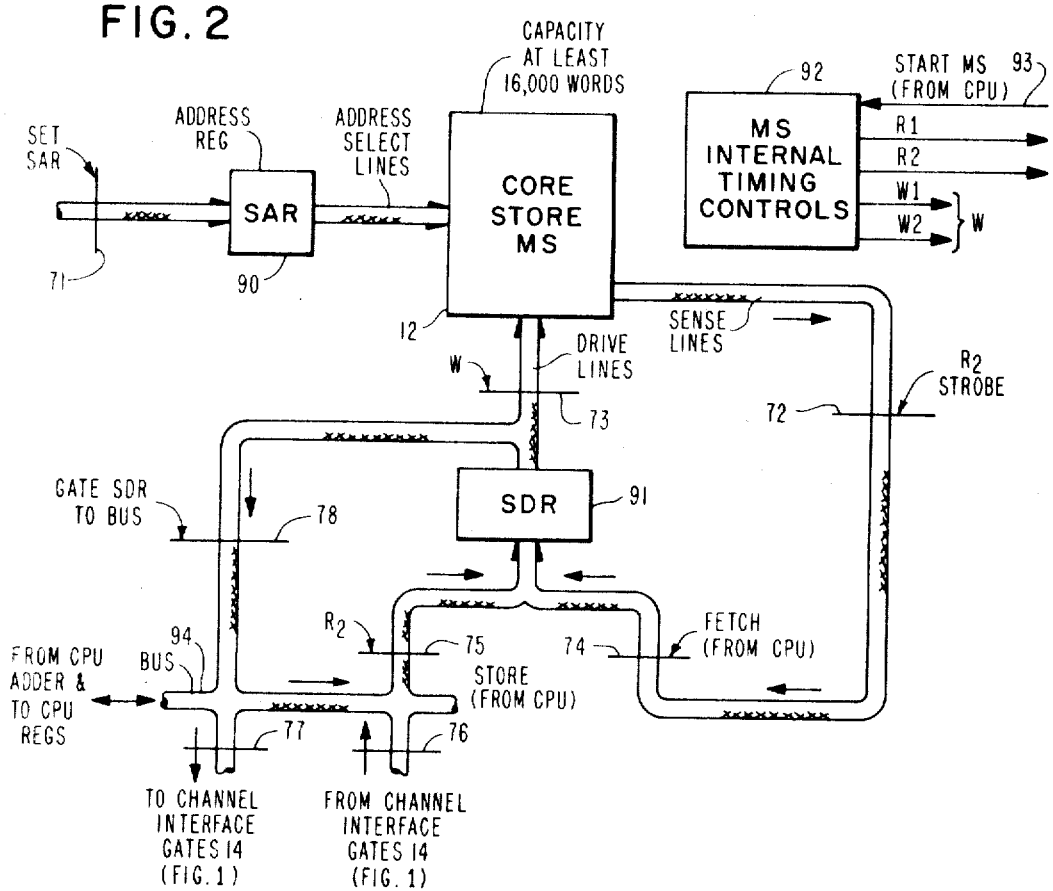
FIGURE 2 is a schematic diagram of the organization of the main store of the central processing unit.
Figure 3:
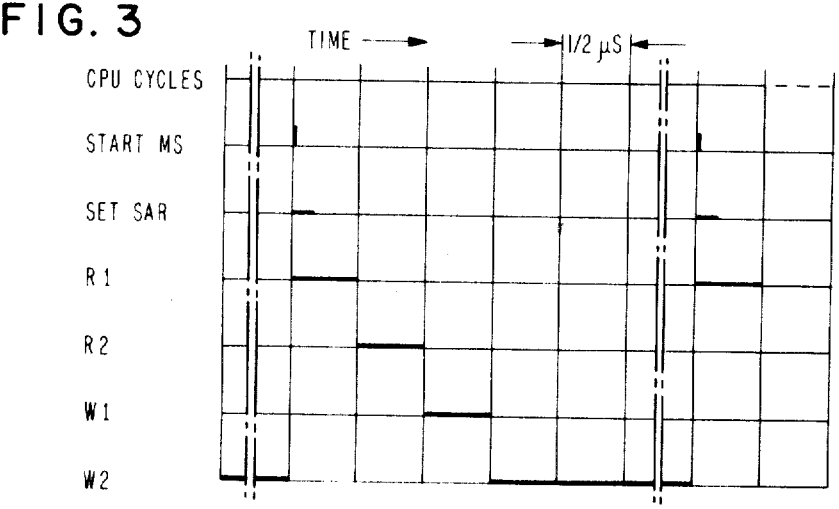
FIGURE 3 is a timing chart used to explain store and fetch operation relative to the main store in FIGURE 2.

Reference is made next to FIGURES 2 and 3 which illustrate in more detail the main store 12, shown in block form in FIGURE 1. FIGURE 2 illustrates the system arrangement of the main store, and FIGURE 3 illustrates the timing relationships involved. Referring more specifically to FIGURE 2, gates 71 through 78 control the flow of information throughout the sub-system. The main store 12 is preferably a matrix array of magnetic cores, and a given address in the array is selected by signals in the storage address register (SAR). Address signals are supplied to the storage address register (SAR) 90 through a set of gates 71. The main store 12 has internal timing controls which respond to a start signal from the central processing unit, and the main store then is operated through its basic memory cycle to read information on output sense lines to a set of gates 72 from the selected address indicated by the storage address register. Information passed by the gates 72 is stored in a storage data register (SDR) 91. The data in the storage data register may be reinserted in the main store by passing it through the set of gates 73, and the data in the storage data register may be supplied through the gates 78 to the central processing unit and through further gates 77 to the channel interface gates 14 in FIGURE 1. Whenever a fetch operation is performed, the gates 72 and 74 are operated to transfer the information from the selected address of the memory array to the storage data register 91, and the information thus read is reinserted through the gates 73 back to the selected address of the array during a WRITE portion of the memory cycle. When a WRITE operation of new data takes place, the gates 72 and 74 are not operated, and the data read from the selected array is thereby lost.

New data to be written into the selected address is inserted into the storage data register 91 through the gates 75 from the central processing unit or through the gates 75 and 76 from the channels. The new data is passed through the gates 73 to the selected address of the memory array during the WRITE portion of the memory cycle.

The main store 12 in FIGURE 2 has a memory cycle which is equal to four machine cycles of the central processing unit. As illustrated in FIGURE 3, each cycle of the main store coincides with four cycles of the central processing unit. A memory cycle is initiated by a START MS signal from the central processing unit, and during the first CPU cycle the SET SAR causes the gates 71 to pass address signals to the storage address register 90 in FIGURE 2. During the first half of the memory cycle, signals R1 and R2 are generated as shown in FIGURE 3. During the terminal half of the memory cycle the signals W1 and W2 are generated as depicted in FIGURE 3. During the time of R1 and R2 the main store performs a read operation, and during the time of W1 and one cycle of W2 (noting that W2 persists indefinitely until a new cycle of the main store is started), the main store performs a WRITE operation, thereby reinserting in the selected address of the main store the same data read or inserting new data, as the case may be. The internal timing controls of the main store are indicated by the block 92 in FIGURE 2. The START MS signal is received on a line 93 whenever the main store is to perform a memory cycle. In response to the START MS signal, signals generated on the lines labeled R1, R2, W1 and W2 at the times indicated in FIGURE 3.

In a fetch operation signals on the sense lines of the main store MS are gated into the storage data register 91 during the R half cycle, and the contents of the storage data register are transferred to the selected internal location of the main store during the W half cycle. Thus, the fetched information transferred into the storage data register is available for read-out to circuits external to the main store, and this information is regeneratively returned to the same place in storage, if it is not to be replaced with new information. In a store operation the information appearing on the sense lines from the main store is blocked, and other information is transferred through an external bus 94 in FIGURE 2 to the storage data register during the R half cycle of the main store. Thereafter during the succeeding W half cycle the new information in the storage data register is transferred to the internal location selected by the storage address register 90.

Local Store

Figure 4:
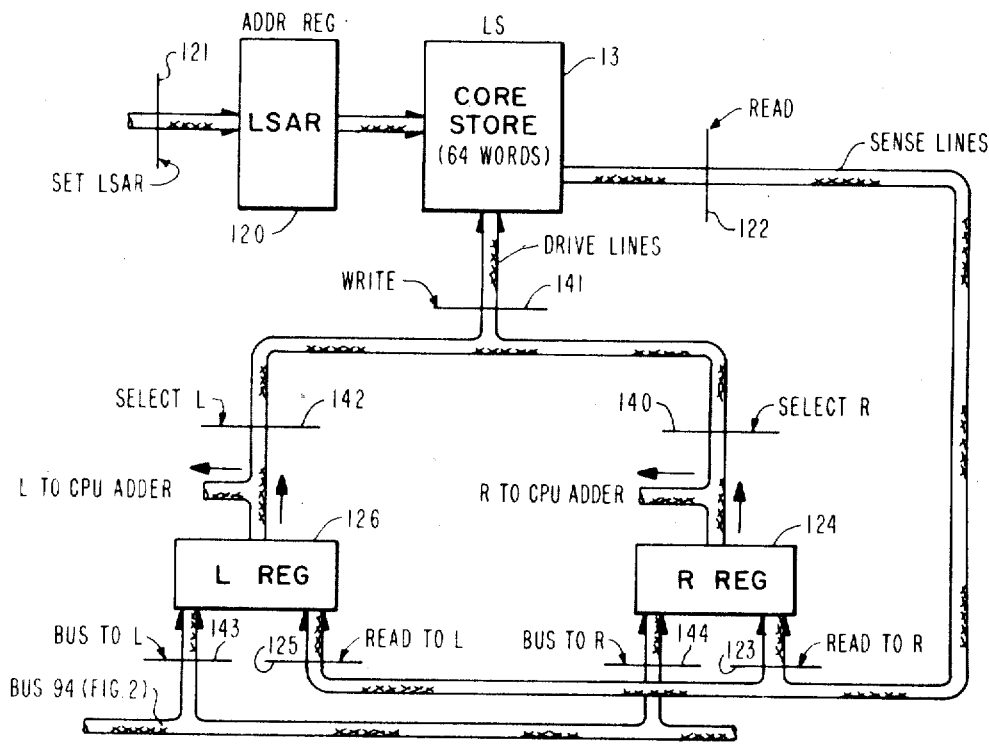
FIGURE 4 is a schematic diagram illustrating the general organization of the local store of the central processing unit.
Figure 5:
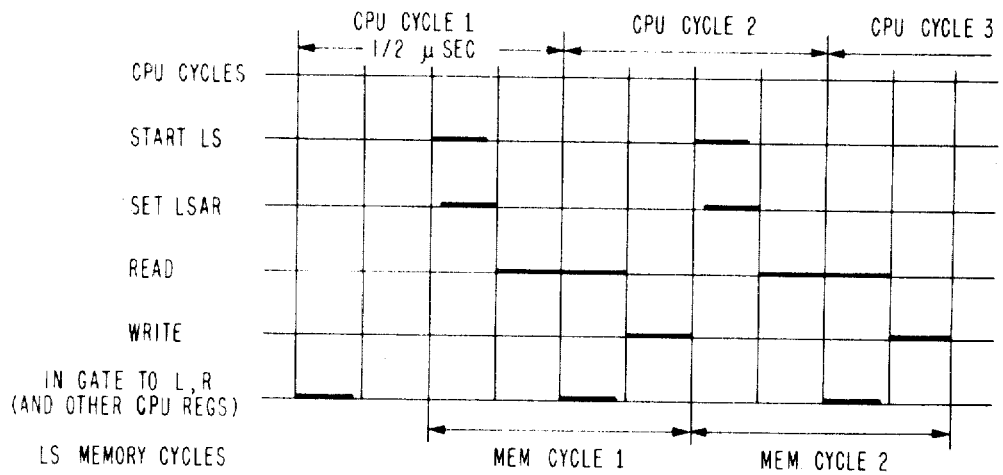
FIGURE 5 is a timing diagram used to explain the operation of the local store and to contrast the timing of such operation with the main store timing of FIGURE 3.

Reference is made next to FIGURES 4 and 5 which show the respective system arrangement of the local store and the timing relationship of its memory cycle. Referring more specifically to FIGURE 4, there is shown a more detailed system arrangement of the local store which is depicted in block form in FIGURE 1. The local store has 64 registers with each register capable of holding one word. A local storage address register (LSAR) 120 holds address signals representing a given one of the 64 registers, and address signals are supplied to the local storage address register through a set of gates 121. Whenever a READ operation is performed, information from the selected address of the local store is supplied through a set of gates 122. The signals passed by these gates are supplied through a set of gates 123 to an R register 124 or through a set of gates 125 to an L register adder which is described subsequently. The output of the R register may be supplied to an arithmetic device or adder which is described subsequently. The output of the R register may be passed by a set of gates 140 and a set of gates 141 to the local store. The output of the L register may be supplied through a set of gates 142 and a set of gates 141 to the local store. Information may be supplied from the bus 94 to the L register and the R register through perspective sets of gates 143 and 144.

The local store operates in a manner similar to the main store except that its cycle of operation is equal in duration to one machine cycle of the central processing unit. Also, there is more freedom of choice in the selection of information to be processed during the WRITE half cycle as pointed out more fully hereinafter. In the READ half cycle information may be transferred from a selected address specified by the local storage address register 120 to one of the two buffer registers, the L register or the R register. In the WRITE half cycle the information in either the L register or the R register may be selectively transferred to the selected address of the local store. While information is being stored into the local store during a WRITE operation, (i.e. in the second quarter of the next CPU cycle), the information previously carried from the sense lines into the L or R registers may be progressively moved out to the CPU adder and from there to the channels as may be seen more fully hereinafter. Conversely, during the READ haly cycle of the local store information signals propagating from a channel toward the L or R registers may be progressively continued on their way during the subsequent WRITE half cycle of the local store 13.

For READ and WRITE transfer operations a given buffer word register location is set aside within the local store for use by each channel whenever channel transfers utilize the indirect route. In the specific embodiment under consideration a word is assumed to consist of 32 bits. One designated register is set aside in the local store for each channel. The individual buffer locations in the local store are thus used selectively as queueing or waiting on line buffer extensions of the corresponding channels when data must be unloaded by the channel in a hurry. For example, in a read operation it may be necessary because of the condition of certain internal buffers of the channel to transfer immediately a word of information to the central processing system in order to make room for an additional word of information which may be imminently entering the channel from an uncontrollable input device such as a tape or other bulk storage unit. Suppose further, that a second channel is in a similar status and has a basic routine request pending. At such times it may not be feasible to allot to the first channel the four cycles required to access the main store and accordingly the shorter route to the local store may be the only useful alternative.

Likewise, in a WRITE operation, because of the status of information flow in a particular channel and actively proceeding concurrently in other channels, it may be desirable to move a word of information from main store into local store on a "look ahead" basis so as to make the word more rapidly accessible to the particular channel when that channel becomes ready to accept a word. In such circumstances it may be desirable to move information from main store to local store in a first relatively slow basic WRITE routine, and then later, in a second relatively fast basic WRITE routine, move the same information from the local store to the particular channel.

The local store has a memory cycle of one-half microsecond. The memory cycle is equal in time duration to a machine cycle of the central processing unit, but the memory cycle is shifted timewise by 180° with respect to the CPU cycle. This is readily seen in FIGURE 5 by comparing the CPU cycle at the top of the diagram with the LS memory cycle at the bottom of the diagram. A START LS signal initiates a memory cycle of the local store, and as illustrated in FIGURE 5 it commences at the mid-point of a CPU cycle. Address signals are set in the local store address register 120 in FIGURE 4 during the initial phase of a memory cycle as indicated in FIGURE 5. The READ portion of a memory cycle occupies 50% of the memory cycle with the mid-point of the READ portion of the cycle coinciding in time with the mid-point of the memory cycle, as shown in FIGURE 5. The WRITE phase occurs during the last 25% of a memory cycle as depicted in FIGURE 5. Ingating to the L register, R register and other CPU registers takes place, as indicated in FIGURE 5, during the latter half of the READ phase of a memory cycle. READ and WRITE operations involving the channels, the main store and the local store, including the timing relationships, the priority selection and route selection, are described in detail in the Crocket et al. application and further elaboration on this subject matter is not given herein in the interest of minimizing the complexity of this application.

*Central processing system*

Figure 6:
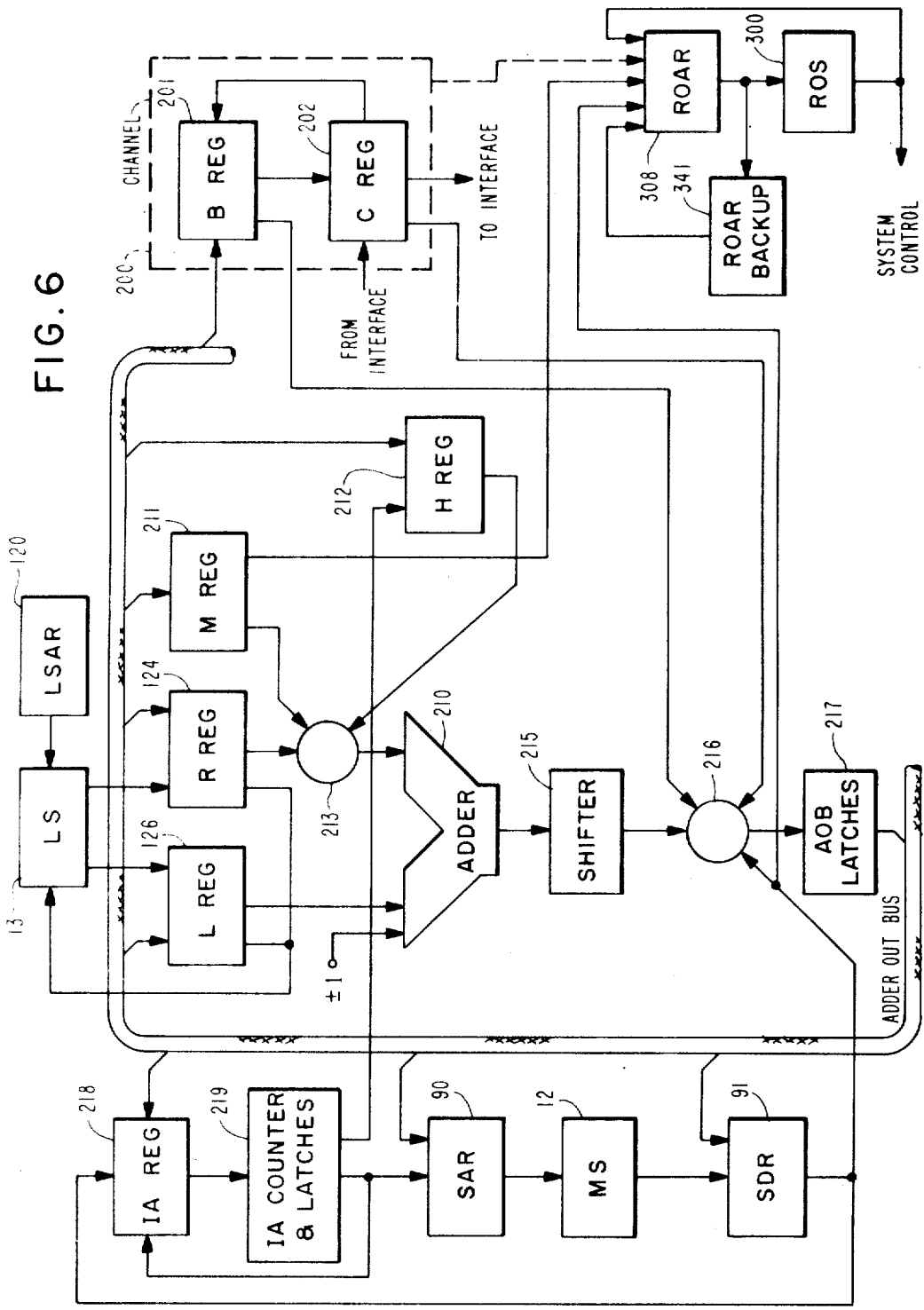
FIGURE 6 is a schematic block diagram of the overall system which shows the interrelationship of the various components of the comprehensive system along with data flow paths.

Reference is made next to FIGURE 6 which illustrates in greater detail the central processing unit 10 in FIGURE 1 and its relationship to a given channel. Corresponding parts in FIGURES 1 and 6 are labeled with the same reference number. In addition to illustrating the central processing unit in greater detail, FIGURE 6 also includes a channel 200. The channel 200 may be any one of the channels illustrated in FIGURE 1, and it is illustrated with a B register 201 and a C register 202 with the remaining channel equipment and controls not shown in the interest of simplicity. The B register and the C register of a channel are employed for various buffering purposes, and access to the central processing unit is essential for this purpose. The channel 200 is included in FIGURE 6 to illustrate how the contents of the B register of the channel 200 may have access to the central processing unit for bidirectional data transfer purposes. The channel 200 includes a register not shown which supplies address signals to the read only store address register 308 during a BREAK-IN routine.

The central processing unit in FIGURE 6 includes an adder 210 which receives an operand from the L register 126 and an operand from the R register 124, an M register 211 or an H register 212 through a gating network 213. The gating network 213 includes provision for complementing either of the operands, thereby affording the adder 210 the flexibility of adding or subtracting two operands. The output of the adder 210 is supplied through a shifter 215, and the output of the shifter may be shifted left or right 0, 1 or 4 places in any one CPU cycle. For a simple add or subtract operation, no shift takes place. Where multiply or divide operations are performed, the output of the adder 210 may be shifted one or more places. The output of the shifter 215 is supplied through a gating network 216 to a group of latches 217 labeled adder out bus latches (AOB LATCHES). The output of the AOB latches 217 is applied to a bus labeled ADDER OUT BUS, and this bus supplies the output of the AOB latches to numerous destinations illustarted. The AOB latches 217 may be operated to supply data on the adder out bus to the storage data register 91, the storage address register 90, an instruction address (IA) register 218, the L register 126, the R register 124, the M register 211, the H register 212 and the B register 201 of the channel 200. Information from the various sources in FIGURE 6 have access to the adder out bus through the gating arrangement 216 and the AOB latches 217. In this connection it is pointed out that the B register 201, the C register 202, and the storage data register 91 have direct access to the gating arrangement 216, and from there the information may be supplied through the AOB latches 217 to the adder out bus. Information from the L register 126, the R register 124, the M register 211 and the H register 212 may be supplied through the adder 210 and the shifter 215 in order to gain access through the gating arrangement 216 and the AOB latches 217 to the adder out bus. It is pointed out that data may be supplied through the adder 210 without modification and through the shifter 215 without a shift in position. Thus information from the L register 126, the R register 124, the M register 211 or the H register 212 may be supplied intact through the adder 210, the shifter 215, the gating arrangement 216 and the AOB latches 217 to the adder out bus, and this information may be supplied on the adder out bus to the various destinations enumerated above. Information in the storage data register 91 may be transferred directly to the read only store address register 308. Thus it is seen that maximum flexibility is provided in transferring data from one selected location to a given destination.

Figure 7:
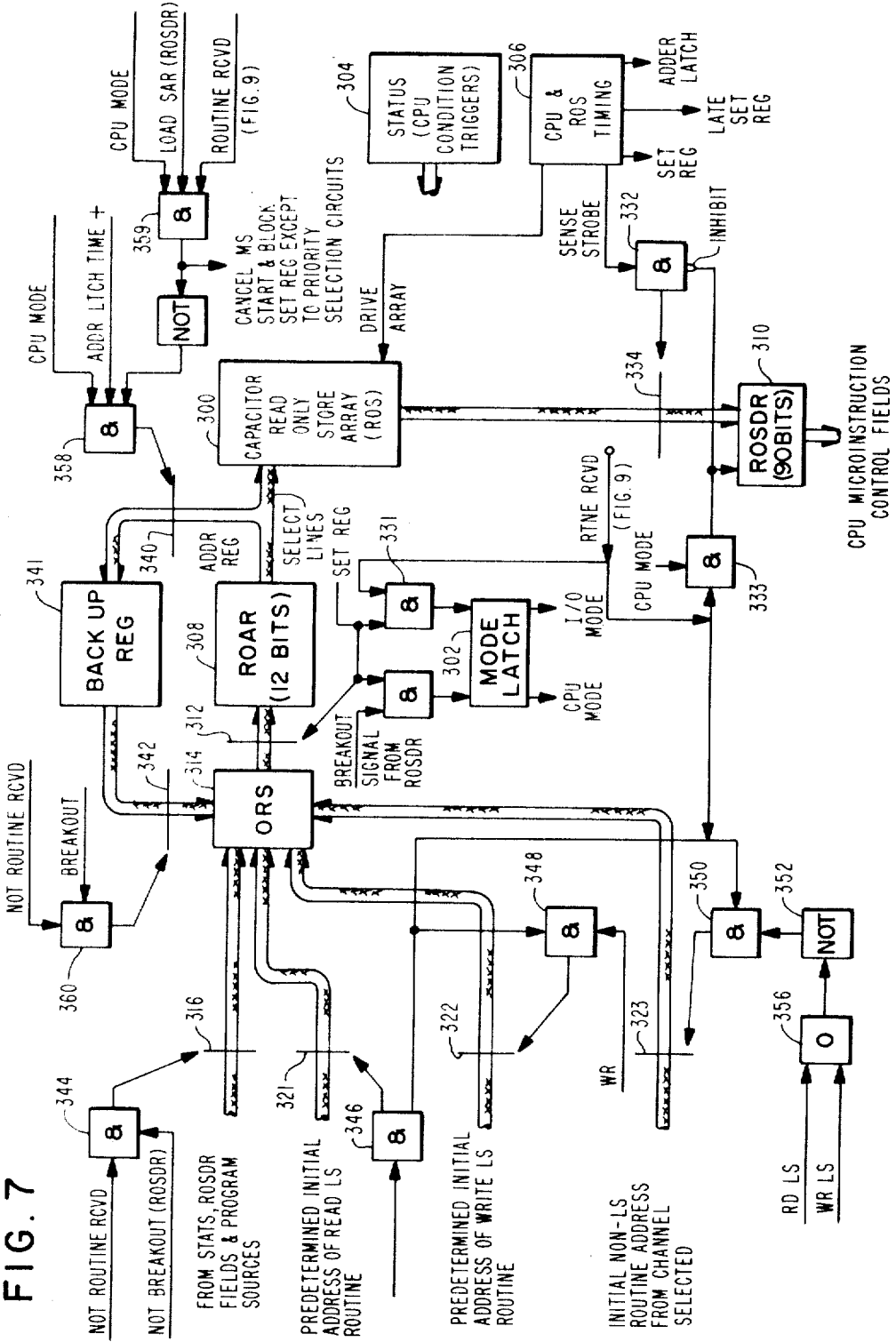
FIGURE 7 is a diagram of the general organization of the sequence controls of the central processing unit.

The instruction address register 218 holds signals representing the address in the main store 12 of instructions to be executed. The address signals in the instruction address register 218 are transferred to an Instruction Counter and Latches 219. As successive instructions are performed, the instruction address is incremented by circulating the content of the IA register through the IA Counter and Latches and back to the IA register, thereby incrementing the value in the IA register. Each instruction is obtained by transferring the content of the instruction address counter 219 to the storage address register 90, and the instruction at a specified address is read from the main store 12 and supplied to the storage data register 91. The instructions stored in the storage data register 91 is transferred through the gating arrangement 216, the AOB latches 217 and the adder out bus to the M register 211. The instruction in the M register 211. has an address portion which is supplied to a read only store address register (ROAR) 308 which in turn supplies the address signals to a read only store 300. The read only store 300 provides output signals representing microinstruction codes which are stored in a read only store data register 310 in FIGURE 7, the output of which is utilized by control apparatus not shown to provide timed signals to operate the overall system under micro-program control. A portion of the output from the read only store data register 310 in FIGURE 7 is is supplied to the read only store address register 308 to determine the appropriate address, and this is indicated generally in FIGURE 6 by the output of the read only store which feeds back to the read only store address reigster 308. A ROAR backup register 341 is employed as a buffer to store the contents of the read only store address register 308 when a program interrupt occurs. A new address may be obtained for the new routine from a channel or from the storage data register 91. Read only store 300 and its affiliated controls are discussed more fully hereinafter.

At times the instruction program in the main store 12 may be interrupted. When such interruption occurs, the content of the instruction address counter 219 is transferred to the H register 212 which serves as a temporary buffer or back up register for the instruction address counter 219. When the interrupting program has been completed, the former program is restored by transferring the contents of the H register 212 through the gating network 213, the adder 210, the shifter 215, the gating arrangement 216, the AOB latches 217 and the adder out bus to the instruction address register 218. The content of the instruction address register 218 is transferred to the instruction address counter 219, and the former program is resumed at the point where it was interrupted.

*Central Controls*

Figure 8:
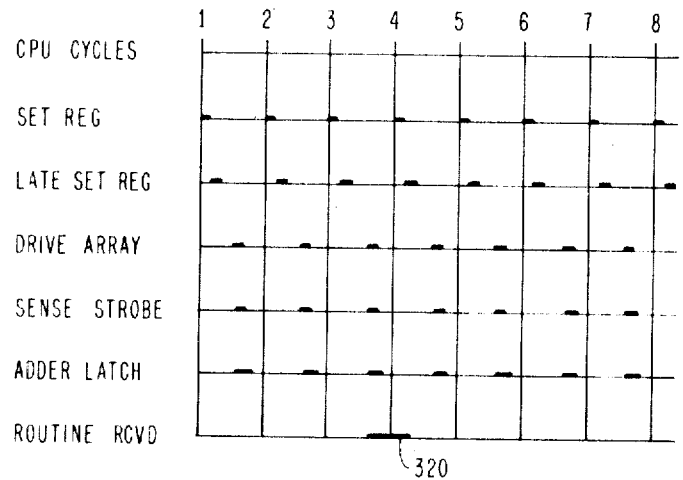
FIGURE 8 is a time chart of the output of the timing circuit 306 in FIGURE 7.
Figure 9:
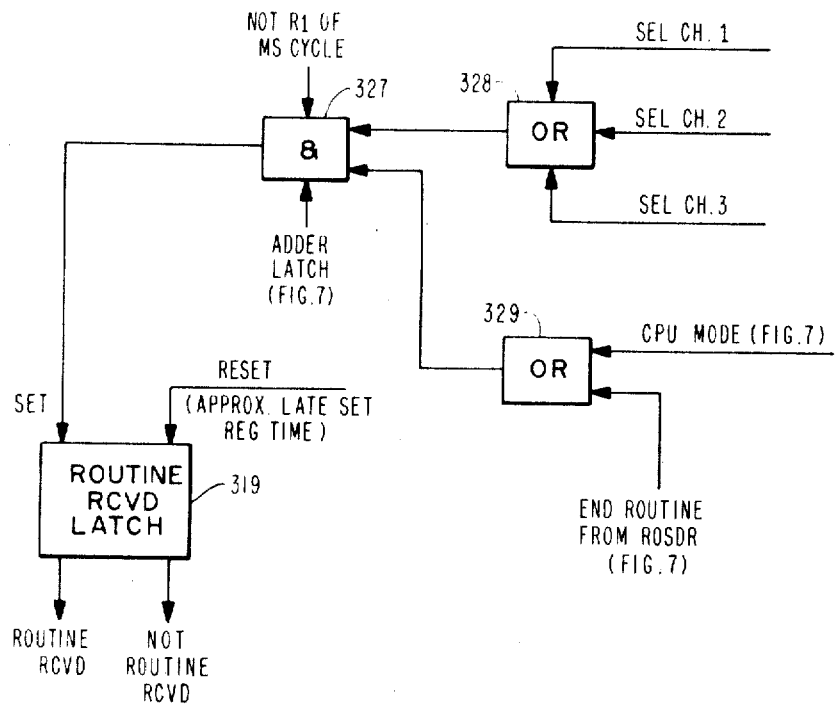
FIGURE 9 indicates the logic for setting ROUTINE RECEIVED.

Reference is made next to FIGURE 7, 8 and 9 which show the central controls for the data processing system. The central controls include a capacitor read only store (ROS) 300 of the type described in an article entitled "Read Only Memory" by C. E. Owen et al. on pages 47 and 48 of the IBM Technical Disclosure Bulletin, Volume 5, No. 8, dated January 1963. The controls include a mode trigger 302, condition triggers 304, also known as STATS, and timing circuits 306. The timing circuits 306 produce five cyclic signals at the CPU frequency which are phased with respect to the zero time reference of each CPU cycle as shown in FIGURE 8.

Data in the read only store is addressed by a twelve-bit selection register (ROAR) 308. Address signals for the ROAR may be taken from various sources including a portion of the output control information from the read only store data register (ROSDR) 310 in each CPU cycle to select one of 2,816 ninety-bit controls words and to enter the same in the read only storage data register 310. Each word, known as a microinstruction, is transferred into the read only store data register 310 at SENSE STROBE time which occurs just prior to the start of the next CPU cycle, and it controls the operation of the central processing unit during the next cycle.

The state of the read only store address register 308 is determined prior to the Drive Array pulse (FIGURE 8) and controls the state of the read only store data register 310 at the following SENSE STROBE time. Thus each entry into the read only store address register 308 usually controls the activity of the CPU in the next consecutive CPU cycle following the entry.

Each entry into the ROAR is determined in one of several different ways by the inputs presented to gates 312 through a network of OR gates 314. Ordinarily the 12-bits presented to the OR network 314 are derived selectively through gates 316 from one or more sources including: a segment of the ROSDR, output conditions registered by selected conditions STATS 304 selected program branching information (program instruction operation codes), and fixed sources of INTERRUPT addresses for control branching in response to program interruptions.

Whenever a channel request line is activated and the CPU is in a condition which permits it to respond, a ROUTINE RECEIVED signal is issued by a latch 319 in FIGURE 9 with the timing and approximate duration shown at 320 in FIGURE 8. This signal enables a group of gates 321, 322, or 323 in FIGURE 7 to pass initial routine address information to the read only store address register 308 in place of the sequential entry which otherwise is passed to the read only store address register 308 through the gates 316. This initiates an IO microprogram routine held in the read only store 300 which in turn controls the basic read or write routine required to execute the request of a channel which has been selected.

As implied in FIGURE 9 by the condition levels supplied to the control inputs of the AND circuit 327 from the OR circuit 328, the OR circuit 329, and the two control levels, the signal ROUTINE RECEIVED is set at ADDER LATCH TIME if (1) one of the SELECT lines of the channels 1 through 3 is properly energized to indicate a channel has been selected, and (2) the main store 12 is not in the $R_1$ phase of operation, as explained with reference to FIGURES 2 and 3. The central controls of FIGURE 7 may be in either the CPU mode or in the last portion of an IO routine of a previous input-output exchange routine (i.e. the read only store data register 310 contains the last microinstruction of an IO data transfer routine or a BREAK-OUT microinstruction). At such times the ROUTINE RECEIVED pulse straddles the DRIVE ARRAY and STROBE output of the circuits 306 in FIGURE 7. It may be seen from the inputs to the AND gate 331 in FIGURE 7 that, if the CPU is in the CPU MODE, the mode latch 302 is not set to the IO MODE until SET REG time of the cycle following the rise of ROUTINE RECEIVED. Therefore, if the CPU MODE is up when ROUTINE RECEIVED first occurs, the AND gate 333 is operated to provide an output level which is up, and this level inhibits the AND circuit 332, thereby suppressing the SENSE STROBE control of sense gates 334 which normally supply input signals to the read only storage data register from the read only store 300. The up level from the AND circuit 333 is supplied to the zero inputs of the read only store data register 310 the result of which is to force all zeroes into the 90-bit read only store data register 310. The all zero condition is a microinstruction BREAK-IN operation. Accordingly, the all zero state of the read only storage data register 310 effect a BREAK-IN cycle of control within the CPU, and this causes various housekeeping operations in the CPU to take place in order to prepare for the forthcoming IO routine. The housekeeping operations include a transfer of the R register contents to a predetermined location in the local storage, thereby leaving the R register free to be used in updating the main storage address and block count information, as well as the input-output data being processed to and from local store during an indirect path routine.

It the CPU is in the CPU MODE, suppression of the sense line inputs to the read only store data register during BREAK-IN in effect causes the CPU to lose its control information for its next normal state. That is, the effect of the last microinstruction is lost. In order to restore the address of this lost microinstruction to the read only store address register 308 during the SET REG time of the BREAK-OUT cycle, so that the CPU may immediately resume where it was interrupted as soon as the CPU mode is restored, with one exception every CPU MODE address entered in the read only store address register 308 is transferred through the gate 340 to a BACK-UP register 341 at approximately ADDER LATCH TIME of each CPU MODE cycle. The exception occurs when the microinstruction in the read only store data register 310 in the cycle preceding BREAK-IN signals for the start of a main store cycle. Not only must this action be suppressed, but to restore this microinstruction after BREAK-OUT it is necessary to preserve its address (of the previous cycle) which now is in the back up register 341. Thus the state of the read only store address register 308 in the last (in the exceptional case the next to last) CPU cycle preceding BREAK-IN remains stored in the back up register 341 until BREAK-OUT; whereupon, the same information is delivered back to the read only store address register 308 through the gates 342. This information is the address of the microinstruction which is suppressed by the BREAK-IN action, and once restored to ROAR, the CPU is in the proper state for continuing the CPU program.

As long as the AND circuit 344 is not energized (NOT ROUTINE RECEIVED and NOT BREAK-OUT state of the read only store data register), the gates 316 are enabled to pass sequential addresses to the read only store address register 308 at the start of each CPU cycle. When ROUTINE RECEIVED occurs, the AND circuits 331 and 333 and the gates 346, 348 and 350 are conditioned. One and only one of the gates 346, 348 or 350 passes an input to the read only store address register 308 at SET REG time of the next CPU cycle. The mode latch 302, if not already in the IO mode, is set to that state. If the mode latch 302 is in the CPU MODE, the read only store data register 310 has all zeros forced therein. This represents the operational code which initiates a BREAK-IN operation. If the mode latch 302 is in the CPU MODE at the start of ROUTINE RECEIVED, any one of the following operations may take place: (1) the gate 346 may pass initial address signals to the read only store address register 308 if a read operation is to take place; (2) the gate 348 may pass initial address signals to the read only store address register 308 if a write operation is to take place; or (3) the gate 350 may pass address signals from a selected channel to the read only store address register 308 where a read or write operation is not involved. In the latter instance an OR circuit 356 receives down levels on its two inputs, and it supplies a down level which is inverted to an up level by the NOT circuit 352 which, in conjunction with the ROUTINE RECEIVED level, conditions the AND circuit 350 which in turn operates the gates 323 to pass address signals from the channel to the read only store address register 308.

The manner in which a channel routine is performed is discussed fully in the above mentioned copending application of Peter N. Crocket et al., and further elaboration on input-output routines of the channels is omitted herein in the interest of simplicity.

During CPU MODE cycles, with certain cycles excepted, each address entry to the read only store address register is placed also in the back up register 341 at approximately ADDER LATCH TIME by the output of the gate 358. The last or next to the last read only store address register entry in the CPU MODE prior to BREAK-IN specifies the microinstruction which is suppressed by the BREAK-IN output of the gate 332, or respectively by the CANCEL MS START output of the AND circuit 359. This same entry is retained in the back up register 341 until a BREAK-OUT cycle occurs without a ROUTINE RECEIVED. At the start of such a BREAK-OUT cycle, the AND circuit 360 energizes the gates 342 to restore the content of the back up register 341 to the read only store address register 308, so that in the very next cycle (after read from ROS) the read only store data register 310 assumes the state it next would have had when BREAK-IN occurred.

The AND circuit 358 responds to the input conditions illustrated in FIGURE 7, and it provides an output level in each CPU MODE cycle slightly after the rise of the ADDER LATCH pulse (ADDER LATCH +). This permits the content of the read only store address register 308 to be placed in the back up register 341 if the AND circuit 359 is not energized. The AND circuit 359 is energized in a CPU MODE cycle only if ROUTINE RECEIVED is active, and an MS cycle is about to be started (by LOAD SAR). At such time the BREAK-IN cycle still follows the cycle of ROUTINE RECEIVED; the effect of the microinstruction held in the read only store data register 310 in the cycle preceding BREAK-IN (in addition to the microinstruction present on the ROS sense lines during BREAK-IN) is suppressed; and the gate 358 is disabled. Thus the back up register 341 preserves the address of the first suppressed microinstruction, not the latter.

*Introduction to IO BREAK-IN BREAK-OUT routines*

IO BREAK-IN is a process of halting the normal CPU flow of microinstructions, forcing a branch of the program to a new set of microinstructions called an IO routine, and at the conclusion of the IO routine or routines, returning the CPU to its previous flow of microinstructions without loss of data or computations as a result of the interruption.

The channels interrupt the CPU for various reasons. First, the CPU data paths and controls are used for storing and fetching information from the main store or local store. Second, the CPU is interrupted so that it may be used to perform channel bookkeeping operations. In this connection, once the main store has started to fetch or store information for a channel, the updating of IO control words may be accomplished during the period the main store is completing its memory cycle, thereby providing more efficient use of CPU and channel equipment to perform data transfers and bookkeeping operations simultaneously. Third, each channel has an additional buffer register in the local store, and this channel buffer register is made available by interrupting the CPU. An IO BREAK-IN which uses the direct route consists of a priority cycle, an IO BREAK-IN cycle, one or more IO routines, and an IO BREAK-OUT cycle. These are discussed more fully hereinafter.

In order to initiate an IO BREAK-IN, two conditions must be met. First, a channel must be requesting an IO routine, and second, the main store must be in a portion of its memory cycle which allows IO BREAK-IN to start. An IO BREAK-IN operation may begin on non-memory cycles of the main store, write cycles of the main store, or the last memory read cycle of the main store. The conditions for IO BREAK-IN are interrogated during each CPU cycle. If the conditions for IO BREAK-IN are met, the cycle is called a priority cycle, and a ROUTINE RECEIVED line (FIGURE 9) signals that an IO BREAK-IN is taking place. The normal chain of CPU microinstructions continues until the end of the priority cycle, and the BREAK-IN cycle takes place in the next CPU cycle. The BREAK-IN cycle is one CPU cycle in length, and it occurs between the priority cycle, (the last CPU read only store cycle) and the first cycle of the read only store routine. During this cycle various events take place. The ROUTINE RECEIVED signal initiates the transfer of the starting address of the selected IO routine into the read only store address register 308 (FIGURE 7); the ROUTINE RECEIVED signal also blocks the word from the read only store 300 which was addressed during the priority cycle; and this word is prevented from being transferred to the read only store data register 310. Instead, zeros are forced into the read only store data register 310 at the beginning of the BREAK-IN cycle. The outputs of the read only storage data register which are modal are switched from the CPU MODE to the IO MODE. Once the read only storage data register contains all zeros and the mode switch is changed to the IO MODE, the output of the read only storage data register is decoded to store the R register in its backup location in the local store. This is done to preserve the content of the R register when the CPU resumes its processing after the interruption. The address of the interrupted or suppressed CPU microinstruction is stored in the read only store back up register where it is preserved for use after the interruption. During an IO operation the input to the back up register 341 is blocked, thereby preserving the proper CPU microinstruction address for an IO BREAK-OUT.

The last microinstruction of an IO routine has as its next address a common microinstruction. This microinstruction is executed during the BREAK-OUT cycle, and it always accomplishes the same function. First, it loads the read only store address register 308 with the address of the next CPU microinstruction, and this address is taken from the read only store back up register 341 where it was preserved during the interruption. Second, the original content of the R register is fetched from the back up location in the local store and returned to the R register. Third, the output fields of the read only store data register which are modal are switched back into the CPU MODE at the conclusion of the BREAK-OUT cycle.

The IO routines vary in length from one to six microinstructions. During the last two CPU cycles of each IO routine and during the CPU cycle when IO BREAK-OUT takes place, a micro order interrogates all external channels for further requests to perform an IO routine. If any channel is requesting a routine at this time, the routine is executed before returning control back to the CPU.

Figure 10:
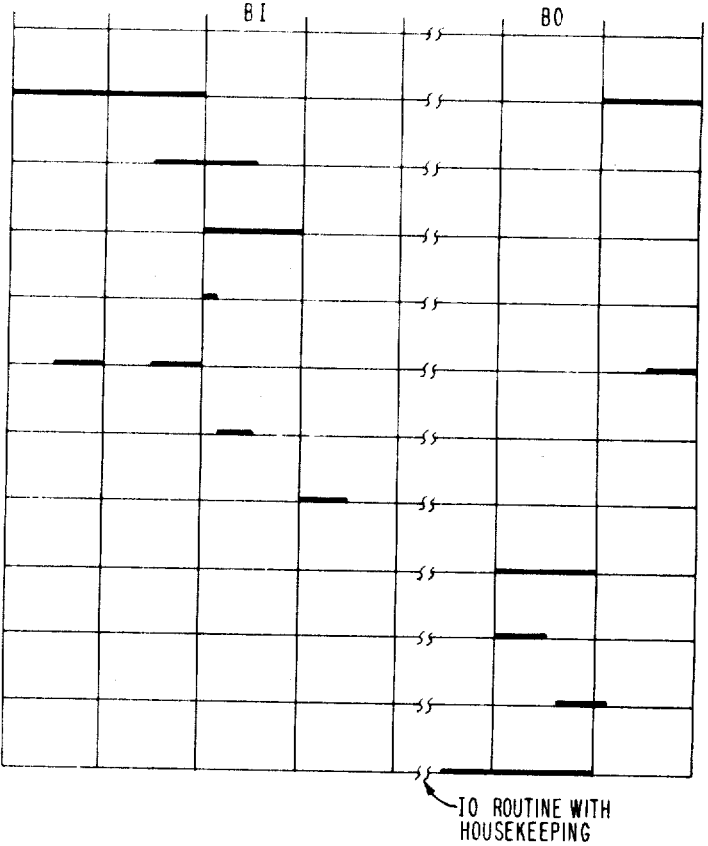
FIGURE 10 is a timing chart which illustrates the occurrence of various events in BREAK-IN and BREAK-OUT operations.

Reference is made next to FIGURE 10 which illustrates the events which take place in an input-output operation involving BREAK-IN and BREAK-OUT operations. The central processing unit is operating in the CPU MODE prior to BREAK-IN as illustrated by event 2 in FIGURE 10. When a ROUTINE RECEIVED signal is generated as illustrated by event 3, the change from CPU MODE to IO MODE takes place, and a BREAK-IN cycle is initiated in the next CPU cycle as illustrated by event 4. As shown by event 5 in FIGURE 10 all zeros are forced into the read only store data register 310 in FIGURE 7 in the initial portion of the BREAK-IN cycle, and the content of the read only store address register 308 is transferred to the back up register 341 during the latter portion of the BREAK-IN cycle as depicted by event 6 in FIGURE 10. A channel address is transferred to the read only store address register 308 during a BREAK-IN cycle as illustrated by event 7 in FIGURE 10, and this address is used to secure the appropriate channel control word from the read only store 300 in FIGURE 7 for use by the read only store data register 310 in generating the appropriate microprogram to execute the data transfer to or from the selected channel. The content of the R register in FIGURE 6 is transferred to a designated register in the local store 13 which is used as a back up storage register for the selected channel. This is indicated by event 8 in FIGURE 10. Event 8 takes place during the first CPU cycle after the BREAK-IN cycle. Events 4 through 8 are associated with a BREAK-IN operation. After a BREAK-IN operation has been completed, a data transfer to or from a selected channel is executed along with housekeeping operations. This is indicated in part by the broken line section of FIGURE 10. Events 9 through 11 take place in a BREAK-OUT operation. An IO BREAK-OUT operation is indicated by event 9, and it follows the data transfer and CPU housekeeping operations associated with the selected channel. As a result of the BREAK-OUT operation initiated by event 9, the content of the back up register 341 in FIGURE 7 is transferred to the read only store address register 308 as indicated by event 10 in FIGURE 10. The content of the designated back up register in the local store 13 in FIGURE 6 is transferred to the R register, thereby restoring to the R register its original content prior to the CPU interrupt. This is indicated by event 11 in FIGURE 10 which is completed during the CPU cycle following the BREAK-OUT cycle. During the BREAK-OUT cycle and during the last two cycles of the CPU interrupt of an IO data exchange, all external channels are sampled for routine requests, and if any channel is requesting an IO routine, it is serviced without restoring the CPU MODE. This permits chaining of IO routines as discussed more fully hereinafter. The sampling of the external channels is indicated by event 12 in FIGURE 10.

*Example of an IO Routine*

FIGURE 11 illustrates a READ routine of the central controls preceded and followed by internal processing operations conducted in CPU MODE. The read routine is selected to take place over the direct route to the main store. It is seen that this routine consists of a BREAK-IN (BI) cycle, followed by four CPU cycles used for an IO routine, followed by a BREAK-OUT (BO) cycle, and finally a RETURN TO CPU MODE operation. After meeting all of the conditions essential for a data transfer, the selected channel issues its READ request in the cycle before BREAK-IN. The BREAK-IN request is honored if the main store is not in the $R_1$ phase. It is assumed that the controls in FIGURE 7 perform an ordinary CPU MODE function during the cycle before BREAK-IN. Selection of one of the channels 1 through 3, after having obtained priority, initiates a ROUTINE RECEIVED signal by the circuits illustrated in FIGURE 9. That is, the OR circuit 328 in FIGURE 9 passes an up level to the AND circuit 327, and the OR circuit 329 passes an up level to the AND circuit 327 because the central processing system is in the CPU MODE. The AND circuit 327 supplies an up level to set the ROUTINE RECEIVED latch 319 provided that the remaining two inputs NOT $R_1$ of MS CYCLE and ADDER LATCH have up levels. An up level from the AND circuit 327 sets the latch 319. When the ROUTINE RECEIVED latch 319 in FIGURE 9 is set, the output labeled ROUTINE RECEIVED is brought up. This causes the IO MODE latch 302 in FIGURE 7 to be changed whereby it supplies an up level on the output labeled IO MODE during the BREAK-IN cycle. The ROUTINE RECEIVED level sets the read only storage data register 310 in FIGURE 7 to the all-zero state during the BREAK-IN cycle, and the read only store address register 308 is set to the address of the initial microinstruction of the transfer routine by operation of the gates 321, 322, or 323 in FIGURE 7. During the cycle prior to BREAK-IN the last entry to the read only store address register 308 is stored in the back up register 341 in FIGURE 7, and this information is preserved for future use since further entries to this register are blocked because the CPU MODE level applied to the AND circuit 358 in FIGURE 7 is a down level which prevents operation of the gates 340.

It is recalled that ROUTINE RECEIVED (FIGURE 9) is not issued unless the main store is not in its $R_1$ phase of operation. The reason is that in order to be able to restore the CPU conditions to the same state which existed just prior to BREAK-IN, upon the subsequent BREAK-OUT and return to CPU MODE, all transactions between the CPU and the main store which were initiated prior to BREAK-IN must be completed subsequent to a BREAK-OUT. It is pointed out that a memory cycle of the main store 12 is started by a microinstruction from the read only storage data register 12, and this microinstruction is determined in the previous CPU cycle. Once a memory cycle of the main store has commenced, it cannot be stopped by the CPU control, and the content of the storage data register 91 in the $R_2$ cycle would be stored invariably in the main store address selected during BREAK-IN. This store operation could not be blocked even though the contents of the storage data register 91 might be incorrect because of the CPU interruption during BREAK-IN. It is for this reason that the BREAK-IN cycle may not follow an $R_1$ portion of the main store cycle. It is pointed out also that since any exchange between the CPU registers and the storage data register 91 is completed during the $R_2$ portion of a main store cycle, at which time either fetched contents of the main store are taken from the storage data register to an appropriate CPU register external to the main store or information being stored in main store is secured in the storage data register and thereby effectively preserved in the main store. Accordingly, it is readily seen that all actions of the CPU are completed in each of the remaining cases, even in the worst one where ROUTINE RECEIVED is issued while the main store is in its $R_2$ phase.

Assuming then that the main store is in the worst case or the $R_2$ phase of its memory cycle when a channel is selected by granting it priority, it follows that in the subsequent BREAK-IN cycle the main store will commence its $W_1$ phase, and in the first CPU cycle of the subsequent IO transfer routine, the main store will commence its $W_2$ phase of operation. Consequently, the signal to start a new memory cycle of the main store 12 and load the storage address register 90 cannot be given by the microprogram control of FIGURE 7 to the main store 12 until the end of the second CPU cycle of the IO routine. For this reason the signal to start the main store is given in the third cycle of the IO transfer routine, and the main store address register 90 is set during the beginning portion of the third CPU cycle of the IO transfer routine with updated information extracted from the local store 13 during the preceding CPU cycle. Since a transfer between a channel B register and the main store is effectively completed by the transfer of the B register information into the storage data register 91 in the $R_2$ cycle, the handling of the information from the storage data register 91 to the internal location of the main store 12 specified by the storage address register 90 being under the exclusive internal control of the main store 12, the IO routine may be terminated after the fourth ($R_2$) CPU cycle.

During the second and third cycles of the IO routine the microinstructions placed in the read only store data register 310 in FIGURE 7 control the housekeeping activities required to decrement the word count and increment the main store data address associated with the word of information being transferred from the selected channel. These activities involve extraction from the local store, processing of these items through the CPU adder and storage of the updated items back to the local store. Once the data transfer and housekeeping operations have been completed, a BREAK-OUT operation takes place if there are no further channel requests to be serviced, and the CPU MODE is restored, thereby permitting the central processing unit to proceed with its processing operations.

FIGURE 11, which shows the timing relationships of the various events in an input-output routine over the direct route, is next discussed with respect to FIGURE 6 which shows the system components with the data flow paths. A BREAK-IN cycle occurs first in FIGURE 11, and the events which take place during a BREAK-IN cycle were discussed above in detail with respect to FIGURE 10. Event 1 in FIGURE 11 illustrates that the basic machine cycle is the CPU cycle. Event 2 in FIGURE 11 illustrates the memory cycles of the local store 13 in FIGURE 6. Events 3 and 4 show the respective read and write portions of the various memory cycles of the local store 13 in FIGURE 6. The local store and its memory cycle were discussed above in greater detail with respect to FIGURES 4 and 5. Event 5 in FIGURE 11 takes place during the first CPU cycle following BREAK-IN and the content of the R register is written into the back up register in the local store designated for the selected channel. It is recalled that one back up register is provided in the local store for all channels. It is pointed out that only one back up register in the local store 13 in FIGURE 6 is required to store the content of the R register since only one channel is serviced at a given time. It is essential to store the content of the R register in the back up register of the local store 13 for two purposes. First, the content of the R register must be preserved for future use when the CPU interrupt is terminated, and second, it is necessary to use the R register during the CPU interrupt in order to perform various housekeeping functions, explained more fully hereinbelow. As illustrated in FIGURE 6, the content of the R register may be transferred directly to the local store 13 to accomplish event 5 in FIGURE 11.

Event 6 in FIGURE 11 takes place during the first quarter of the second CPU cycle, and information representing a data address is transferred from the local store to the R register. More specifically, the read only storage data register 310 in FIGURE 7 supplies address signals to the local store address register 120 in FIGURE 6, and these address signals cause information at the designated address to be read from the local store 13 and supplied to the R register 124 in FIGURE 6. The information thus supplied to the R register represent the data address in the main store 12 to which information is to be transferred or from which information is to be extracted. The information in the R register is incremented by the value of 1 (updated) in the adder 210 before it is supplied to the storage address register 90 as explained subsequently. Event 7 takes place during the second quarter of the second CPU cycle as illustrated in FIGURE 11. During event 7 the content of the L register 126 in FIGURE 6 is transferred to the local store 13, and it is stored in the same register from which the data address information was extracted in the first quarter of the second CPU cycle. This is readily seen by observing the relative timing relationships of events 6 and 7 in FIGURE 11. In essence, the content of the L register is stored in the local store at the same address from which the data address information was extracted and placed in the R register, thereby clearing the L register for use in subsequent updating operations and also preserving the previous content of the L register for future use after the interrupt is terminated. It is pointed out that events 6 and 7 take place during the second memory cycle of the local store. That is, that portion of the READ cycle of the second memory cycle of the local store which occurs during the first quarter of the second CPU cycle involves the transfer of data address information from the local store to the R register, and information in the L register is supplied to and written in the local store at the same address during the write portion of the same or second memory cycle of the local store which occurs in time during the second quarter of the second CPU cycle. The specific manner in which events 6 and 7 take place may be readily understood by referring to FIGURES 4 and 5. The address signal supplied to the local storage address register 120 in FIGURE 4 designate the register in the local store 13 where data address information is located. This address information is supplied from the local store 13 through the gates 122 along the sense lines through gates 123 to the R register during the read portion of the memory cycle which, as illustrated in FIGURE 5, takes place during the second and third quarters of the memory cycle. The gates 140 in FIGURE 4 are energized to inhibit the passage of information therethrough from the R register 124. Instead, information in the L register 126 is passed through the gates 142 and the gates 141 to the input of the local store 13, and this information is written in the same address from which the address information was extracted during the read portion of the same memory cycle.

Event 8 in FIGURE 11 starts in the second CPU cycle and extends partially into the third CPU cycle. This involves incrementing the address signals in the R register by the value of 1 (considered an updating or housekeeping operation) by supplying the content of the R register 124 in FIGURE 6 through the gating arrangement 213, to the adder 210 with the +1 input of the adder energized through the shifter 215 without a shift operation, and through the gates 216 to the adder out bus latches 217. The incremented value of the address signals is stored in the latches 217 approximately at the end of the second CPU cycle, and the incremented value of the address signals is transferred at the beginning of the third CPU cycle to the storage address register 90 in FIGURE 6 and to the L register 126 the content of which was previously stored by event 7. The main store 12 in FIGURE 6 commences a memory cycle at the beginning of the third CPU cycle, and this is indicated by event 9 in FIGURE 11. The information extracted from the main store 12 in FIGURE 6 is taken from an address indicated by the incremented address signals supplied to the storage address register 90 at the beginning of the third CPU cycle as mentioned above with respect to event 8. Event 10 in FIGURE 11 shows various portions of a memory cycle of the main store 12 in FIGURE 6. Operations involved in a memory cycle of the main store 12 were previously explained in detail with reference to FIGURES 2 and 3.

Event 11 in FIGURE 11 involves reading information representing the word count, indicating the number of words to be transferred to or from the selected channel, from a selected address in the local store 13 in FIGURE 6, transferring the count information to the R register 124 and writing in the same memory cycle the content of the L register 126, which holds the incremented address, in the same register in the local store 13 vacated by the count information. This takes place during the third local store memory cycle. Address signals for this memory cycle are supplied from the read only storage data register 310 in FIGURE 7 to the local storage address register 120 in FIGURE 6 during the first quarter of the third local store memory cycle at set local storage address register time (SET LSAR). The SET LSAR time is indicated in FIGURE 5 as occurring during the first quarter of each memory cycle of the local store. It is seen in FIGURE 11 that the third memory cycle of the local store commences at the mid-point of the second CPU cycle, and this local store memory cycle is terminated at the mid-point of the third CPU cycle in FIGURE 11. During the first quarter of the third CPU cycle the content of the selected address in the local store 13 in FIGURE 6 is transferred to the R register 124, and during the second quarter of the third CPU cycle in FIGURE 11, the content of the L register, containing the incremented address, is stored in the selected address of the local store from which the count signals were extracted. This store operation constitutes event 12 in FIGURE 11.

During event 13 in FIGURE 11 the count signals are decremented by the value of 1 in the adder 210 in FIGURE 6, and the result is stored in the L register which was previously vacated by event 12 of the incremented address signals. The decrementing of the count takes place during the period of time commencing in the third CPU cycle and terminating in the fourth CPU cycle. The count is decremented by transferring the content of the R register 126 in FIGURE 6 through the adder 210 with the −1 input of the adder energized, and the decremented value is transferred without shifting through the shifter 215 and the gates 216 to the adder out bus latches 217 where the decremented count is stored. The decremented count is stored in the adder out bus latches 217 at approximately the end of the third CPU cycle, and the decremented count is transferred from the adder out bus latches 217 to the L register 126 at the beginning of the fourth CPU cycle.

Events 14 and 15 are performed next with event 14 occurring during the first quarter of the fourth CPU cycle and event 15 occurring during the second quarter of the fourth CPU cycle. The same address signals in the local store address register 120 in FIGURE 6 are used for the fourth memory cycle of the local store as were previously used for the third memory cycle. During the third quarter of the fourth memory cycle of the local store the incremented address signals stored at the location specified by the address signals in the local storage address register 120, are read from the local store 13 in FIGURE 6 and transferred to the R register. It is recalled from event 12 that these signals represent the incremented address. During the fourth quarter of the fourth memory cycle of the local store the decremented count in the L register 126 in FIGURE 6 is transferred to and stored in the local store 13 at the same address from which these count signals were originally taken by event 11.

Events 16 and 17 occur next and they take place during the respective third and fourth quarters of the fifth memory cycle of the local store as indicated in FIGURE 11. In order to execute events 16 and 17 in FIGURE 11 address signals are supplied from the read only data register 310 in FIGURE 7 to the local store address register 120 in FIGURE 6, and these address signals represent the same address in the local store from which the data address signals (for MS) were originally taken by event 6. The address signals for the local store are transferred to the local store address register 120 in FIGURE 6 at SET LSAR time which, as illustrated in FIGURE 5, takes place during the first quarter of the local store memory cycle. This time period coincides with the third quarter of the fourth CPU cycle in FIGURE 11. During the third quarter of the fifth memory cycle of the local store in FIGURE 11 information is read from the local store at the address specified by the local storage address register 120, and this information is transferred to the L register. This event restores the initial content of the L register which was earlier stored at this address by event 7. During the fourth quarter of the fifth memory cycle of the local store in FIGURE 11 the content of the R register 124 in FIGURE 6, representing the incremented address, is stored in the local store 13 at the same address from which data address signals (for MS) were previously extracted by event 6. Thus the initial content of the L register is restored by event 16, and the incremented address signals are restored by event 17 to the same address from which they were earlier taken.

In the fourth CPU cycle event 18 in FIGURE 11 is performed, and information from the selected channel is transferred to the storage data register 91 in FIGURE 6 for ultimate storage in the main store 12 at the location specified by the incremented data address signals which were determined by event 8 in FIGURE 11 and stored in the storage address register 90 in FIGURE 6. Channel data in the storage data register 91 in FIGURE 6 is transferred to and stored in the main store 12 as illustrated in FIGURE 2 during the write portion of the memory cycle of the main store as earlier explained in detail with reference to FIGURE 3. The transfer of channel data to the storage data register 91 in FIGURE 6 takes place during the fourth CPU cycle. It is recalled that any exchange between the data storage register 91 in FIGURE 6 is completed during the $R_2$ portion of the main store memory cycle, and once such a transfer has been completed, the content of the storage data register 91 in FIGURE 6 is invariably stored in the main store because the memory cycle of the main store cannot be interrupted after this point in time. Accordingly, the channel data transferred to the storage data register 91 in FIGURE 6 is invariably stored in the main store 12 by event 18 in FIGURE 11, and a BREAK-OUT operation may commence after the fourth CPU cycle without affecting the storage of channel data in the main store 12 in FIGURE 6.

Event 19 initiates a BREAK-OUT cycle, and a BREAK-OUT cycle was explained earlier with reference to events 9 through 12 of FIGURE 10. The BREAK-OUT cycle involves sampling the channels to determine if any channel is requesting an IO routine. If such a request is found, the CPU interrupt is continued and another IO routine is performed. If no channel requests are found, the content of the back up register 341 in FIGURE 7 is transferred to the read only store address register 308, thereby restoring the original content of the read only store address register. Also, the original content of the R register is restored by reading from local store the content of the R back up register. The address signals which specify the location of the R back up register in local store are transferred from the read only store data register 310 in FIGURE 7 to the local storage address register 120 in FIGURE 6 during the first quarter of the sixth memory cycle of the local store in FIGURE 11. This transfer takes place at set local store address register time shown in FIGURE 5. The address signals are the same address signals used in event 5 in FIGURE 11. The content of the R back up register in the local store is transferred to the R register during the third quarter of the sixth memory cycle of the local store in FIGURE 11. This time is coincident with the first quarter of the first CPU cycle following the BREAK-OUT CPU cycle in FIGURE 11. This data transfer is illustrated as event 11 in FIGURE 10. The timing relationship of the transfer from the back up register 341 in FIGURE 7 to the read only store address register 308 may be observed in FIGURE 7. The content of the back up register 341 is transferred through the gates 342 if BREAK-OUT occurs and no channel is requesting service. This is signified by the AND circuit 360 which has the inputs BREAK-OUT and NOT ROUTINE RECEIVED. If these conditions are met, the content of the back up register 341 in FIGURE 7 is transferred through the gates 342, the OR circuits 314 and the gates 312 to the read only store address register 308 at SET REG time. A SET REG signal is received from the CPU AND ROS TIMING 306 which, as illustrated in FIGURE 8, occurs during the initial portion of each CPU cycle.

Thus it is seen from the foregoing how a channel obtains priority, interrupts the CPU, transfers data to the main store, updates control words by incrementing the main store data address held in the local store and decrements the count stored in the local store, and releases the CPU for further processing in the CPU mode. A transfer from the main store to a channel along the indirect route is executed in a fashion similar to that illustrated in FIGURE 11.

Chaining of IO routines

The IO routines are each limited to a maximum of six CPU cycles in duration, and this is done to prevent one channel from monopolizing CPU facilities for an extended period of time and causing overruns on waiting channels. This six CPU cycle limitation permits high data rates on all channels by insuring that all requests are considered in priority circuits without long delays. It is preferable, where a plurality of channels require service, to chain the channel IO routines by (1) using one CPU cycle for BREAK-IN with the first IO routine, (2) performing each of the IO routines in turn without loss of any CPU cycles therebetween, and (3) using one CPU cycle for BREAK-OUT upon completion of the last IO routine. Such operation provides the maximum data rate exchange between the channels and the CPU with a minimum of CPU interrupt time. However, it is not possible in an asynchronous system to secure this type of operation consistently. There are four possible cases involving chaining, and each is considered separately below.

Case I.—This case involves the situation considered immediately above, and its implementation is now described further. During a number of cycles of each IO routine, including the BREAK-OUT cycle if one occurs, the channels may be interrogated to determine whether any channel is requesting service. If a request for an IO routine is made before BREAK-OUT, a BREAK-OUT cycle does not occur, and the channel requesting service commences its IO routine in the CPU cycle immediately following the last CPU cycle of the previous IO routine. The channel requesting service sends the address of its microprogram routine in the read-only store to the read-only store address register 308 in FIGURE 7 during the last cycle of the previous IO routine, and this permits the read-only store to supply the first microinstruction word to the read-only storage data register 310 at the beginning of the first CPU cycle of the next IO routine. The result, therefore, is the chaining of one IO routine to another without the loss of any CPU cycle between the IO routines, thereby providing maximum efficiency of data transfers to or from the CPU and the channels. The second and subsequent IO routines which are thus chained realize a saving of two CPU cycles each or a net time saving of one-third. The last IO routine saves one cycle (BREAK-IN) for a net time saving of one-sixth.

Case II.—In some instances a BREAK-OUT cycle may be commenced simultaneously as an IO request for a new routine is acknowledged. In this case the microinstruction for performing BREAK-OUT commences its operation, and it cannot be terminated. However, the IO request for a new routine serves to inhibit the effect of BREAK-OUT by, among other things, (1) inhibiting the transfer of the address of the next CPU microinstruction from the back up register 341 in FIGURE 1 to the read-only store address register 308 and (2) retaining the content of the R back up register in the local store by the non-destructive reading of the local store during BREAK-OUT. In essence this inhibits the effect of the BREAK-OUT cycle which, as discussed with reference to FIGURE 10, consists of events 11 and 12. The channel requesting service transfers address signals at the beginning of the BREAK-OUT cycle to the read-only store address register 308 in FIGURE 7, thereby specifying the starting address of the new IO routine. The address signals are sent from the selected channel to the read-only store address register 308 in FIGURE 7 early in the BREAK-OUT cycle, and they are effective to operate the read-only store 300 in FIGURE 7 through a complete memory cycle and provide the first microinstruction of the selected IO routine to the read-only storage data register 310 at the beginning of the next CPU cycle which constitutes the first CPU cycle of the new IO routine. In this case it is unnecessary to force all zeros into the read-only storage data register 310 because a BREAK-IN cycle, as such, has been accomplished by (1) not restoring the content of the R back up register to the R register and (2) not restoring the content of the back up register 341 in FIGURE 7 to the read-only store address register 308. The effect of BREAK-OUT is inhibited by the AND circuits 358 and 360 in FIGURE 7 when ROUTINE RECEIVED comes up which thereby deconditions these And circuits and preserves the content of the back up register 341, and the content of the R register in the local store backup register is preserved since the local store operates to read nondestructively. Also, the mode latch 302 in FIGURE 7 continues in the IO mode. Note that events 5 through 7 in FIGURE 10, constituting the events associated with a BREAK-IN cycle, are satisfied. Thus it is seen that one IO routine is chained to another routine, but one CPU cycle for BREAK-OUT was required. There is in this case, nevertheless, a saving of one CPU cycle, i.e. a BREAK-IN cycle. To the extent that the BREAK-IN cycle is eliminated, the second or chained IO routine is performed in four CPU cycles and a BREAK-OUT cycle, assuming no further requests are made at the end of this routine and the direct route is employed. Since an IO routine requires six CPU cycles, if it runs a full course using the direct route, the net benefit of chaining in this instance results in a time saving of one-sixth.

Case III.—Case III may be defined as the normal case. That is, it is anticipated that many channel requests take place at relatively widely separated points in time. As a consequence, the CPU is interrupted for each such IO routine. If the direct route is used each IO routine involves a BREAK-IN cycle, four CPU cycles for performing bookkeeping operations and a data transfer to the main store, and a BREAK-OUT cycle which restores the CPU to the CPU mode. As pointed out earlier, particularly with respect to FIGURES 10 and 11, such an IO routine is performed with a minimum of CPU interrupt time, and housekeeping operations, involving updating of address and account information, is performed coincident in time with the data transfer from the channel to the main store. Thus there is a minimal interrupt time of the CPU; there is maximum use of the CPU hardware by the IO routine; and no additional CPU storage capacity is required.

Case IV.—Case IV involves the situation where one IO routine is initiated and completed, and during the BREAK-OUT cycle, priority is granted to a requesting channel which initiates a BREAK-IN cycle during the next CPU cycle. In essence two complete IO routines occur back to back. More specifically, if the direct route is used, the first IO routine uses a BREAK-IN cycle, four CPU cycles to transfer to main store and perform housekeeping operations followed by a BREAK-OUT cycle, and the second IO routine commences its BREAK-IN cycle immediately following the BREAK-OUT cycle of the earlier routine. Case II and Case IV involve situations which are, strictly speaking, not chaining operations. In Case I and Case II chaining does in fact occur. Thus it is seen that chaining results in a substantial saving of time where one IO routine may be chained to another with no loss of CPU cycles therebetween, as in Case I above, or with only one CPU cycle lost therebetween, as in Case II above.

While the invention has been particularly shown and described with reference to a preferred embodiment thereof, it will be understood by those skilled in the art that various changes in form and details may be made therein without departing from the spirit and scope of the invention.

What is claimed is:

1. A data processing system including
a central processing unit having a machine cycle of a predetermined duration,
an input-output system coupled to said central processing unit,
said central processing unit including a local store having a plurality of addressable storage registers, a first address register coupled to said local store, an L register and an R register coupled to receive data from said local store, an arithmetic unit, means coupling the L and R registers to the arithmetic unit, a main store having a plurality of addressable storage registers, a second address register coupled to the main store, a storage data register coupled to receive data from or to supply data to the main store, a read only store having a plurality of addressable storage registers, a third address register coupled to the read only store, a read only store data register for receiving data from the read only store, said read only store holding micro-instruction program data which is read from the addressable storage register selected by said third address register and supplied to the read only store data register during each central processing unit machine cycle, first control means coupled to receive microinstruction program data from said read only store data register and provide control signals for operating said data processing system, a back up register coupled to receive data from or supply data to said third address register, an out bus, a latch register coupled to the out bus, a gating network disposed between the arithmetic unit and the latch register, means connecting said storage data register to said gating network, means connecting the out bus to the storage data register, said second address register, said L register, said R register, and said input-output system, said out bus connecting said input-output system to said storage data register for providing data flow in either direction, said input-output system including service request means to request a transfer of data to or from said main store through said storage data register, second control means in the central processing unit which responds in one machine cycle of said central processing unit to said service request means and in the next machine cycle of the central processing unit performs a break-in routine which interrupts or suspends the micro-instruction program of the central processing unit and conditions said central processing unit for immediately performing an input-output routine.

2. The apparatus of claim 1 wherein the break-in routine is completed in one machine cycle of the central processing unit and said second control means includes:
(1) first means which forces signals representing a given code into the read only store data register,
(2) second means which isolates the back-up register for the duration of said program suspension,
(3) third means which transfers address signals from the input-output system to said third address register for indicating the location in said read-only store where an associated input-output instruction routine is stored, and
(4) fourth means which stores the content of the R register in a given location in said local store in the machine cycle of the central processing unit immediately following the termination of the break-in machine cycle of the central processing unit, said R register being the only register in the central processing unit which has its content stored in any of said stores for the remainder of said program interrupt or suspension, whereby a path is provided for the transfer of data from the local store to the arithmetic unit during said program interrupt or suspension.

3. The apparatus of claim 2 wherein means is provided to transfer information in either direction between said central processing unit and said input-output system,
third control means which performs a break-out routine in one machine cycle to terminate the program suspension after executing said information transfer in either direction between said central processing unit and said input-output system,
said third control means including fifth means for transferring the content of said back-up register to said third address register, and
sixth means which transfers the content of said given register in the local store to said R register in the machine cycle of the central processing unit immediately following the break-out cycle, whereby said program interrupt or suspension is vacated and the program for the central processing unit continues from the same point where it was interrupted.

4. A program interrupt arrangement for data processing system having a central processing unit and an input-output system coupled together for exchanging data therebetween in either direction, said input-output system including first means to provide a given signal whenever a data exchange is desired, said central processing system having repetitive cycles of operation, said central processing system including:
an addressable first store, a first address register coupled to said first store, a back-up register coupled to said first address register for receiving information from or supplying information to said first address register, a first output register coupled to receive information from said first store, a controller coupled to said first output register for receiving control information therefrom, said controller responding to said control information and in turn supplying control signals for operating said data processing system,
second means disposed between said first store and said first output register, third means connecting said first means to said second means, said second means responding to said given signal from the input-output system and inhibiting the transfer of information from said first store to said first output register, and
fourth means connected between said first output register and said first means, said fourth means responding to said given signal and forcing a given code into said first output register which initiates an input-output routine and thereby operates said controller to execute a data exchange in either direction between the central processing unit and the input-output system.

5. The apparatus of claim 4 further including:
an addressable second store for holding control words, a second address register coupled to said second store, an L register and an R register coupled to said second store for receiving information from and supplying information to said second store,
an adder coupled to said R register, an output bus coupling said adder to said L register,
an addressable third store, a third address register coupled to said third store, a third output register coupled to said third store for receiving data from or supplying data to said third store, said third output register and said input-output system being coupled to said output bus, whereby data may be exchanged along said output bus between the central processing unit and the input-output system in either direction, said controller including,
first control means which transfers the content of the first address register to the backup register and isolates the back-up register for the duration of a program interrupt,
second control means which stores address signals in said first address register indicating the location in said first store where an input-output routine is stored, and
third control means which operates said second store to store the content of the R register in a specified location,
whereby the program interrupt is completed and said central processing unit is conditioned to exchange data in either direction with the input-output system.

6. The apparatus of claim 5 wherein said controller further includes:
fourth control means which operates said second store to deliver the content of a selected address to said R register and to store in said selected address the content of the L register,
fifth control means which supplies the content of the R register to said adder which is operated to increment this quantity by the value of 1 and supply the incremented value to said L register and to said third address register, and said third address register in turn controlling said third store to read from or write in such indicated address data involved in the data exchange with the input-output system along said output bus.

7. The apparatus of claim 6 wherein said controller further includes:

sixth control means which operates said second store to deliver the content of a given location to said R register and to store in said given address the content of said L register, seventh control means which supplies the content of the R register to said adder which is operated to decrement this quantity by the value of 1 and supply the decremented value to said L register, eighth control means which operates said second store to deliver the content of said given location to said R register and to store in said given location the content of said L register, and ninth control means which operates said second store to deliver the content of said selected location to said L register, whereby a data exchange between said central processing unit and said input-output system is executed and control words in said second store are updated in the process.

8. The apparatus of claim 7 wherein said controller further includes:

tenth control means which transfers the content of said back-up register to said first address register and operates said second store to deliver the content of said specified location to said R register, whereby said program interrupt is terminated, the status of the central processing unit is restored and said central processing unit continues from the point in its program where it was interrupted.

9. The apparatus of claim 8 wherein said controller includes additional means which executes additional data exchanges and corresponding updating operations (1) without any loss of central processing unit time between such data exchanges provided said first means in said input-output system supplies said given signal before each data exchange is completed, and (2) with a loss of only one cycle of the central processing unit if said first means in said input-output system supplies said given signal after a data exchange is completed but before the program interrupt is terminated.

10. A data processing system including a central processing unit and an input-output system, said central processing unit having a machine cycle of a given time duration, the data processing system including a read-only store for storing microinstructions for opening said system, said ready only store having a memory cycle equal to or less than the time duration of a machine cycle of said central processing unit, an address register coupled to said read only store for indicating a storage address in said store, a read only store data register coupled to said read only store for receiving signals representing microinstructions, said read only store responding to signals in said address register and providing microinstruction signals corresponding to the indicated address to said read only store data register for the next central procesing unit machine cycle, first means responsive to signals from the read only store data register for supplying control signals to operate the data processing system, a back-up register coupled to said address register, data control means disposed between the back-up register and the address register for transferring the content of either of said registers to the other but which normally transfers the content of the address register to the back-up register during the latter portion of each memory cycle of the read only store, whereby the address signals in the back-up register in a given memory cycle of the read only store indicate the address in the read only store from which data was read during the preceding memory cycle of the read only store, said input-output system including control means for generating a given signal when service is needed, second means responsive to said given signal generated by the input-output system which interrupts the central processing unit during one of its machine cycles by forcing a given code representing a break-in microinstruction into the read only store data register, third means disposed between the read only store and the read only store data register which responds to said given signal generated by the input-output system to inhibit a transfer of microinstruction signals from the read only store to the read only store data register, and fourth means coupled to the data transfer control means which inhibits data transfers to or from the back up register for the duration of the interruption of the central processing unit, whereby the break-in microinstruction is initiated without the delay of one read only store memory cycle because said given code is forced into the read only store data register directly and the content of the back up register is preserved by said third means for subsequent use after completion of the interruption of the central processing unit.

11. The apparatus of claim 10 wherein said second means forces signals representing all zeros into the read only store data register in response to said given signal generated by the input-output system, said input-output system including one or more channels with each channel having one or more input-output devices, each channel having control means for generating said given signal when service is needed by any input-output device on the associated channel.

12. A data processing system including a central processing unit, said central processing unit having a machine cycle of a given time duration; an input-output coupled to said central processing unit; a controller coupled to the central processing system and the input-output system for operating said data processing system in a first mode wherein the central processing unit performs processing functions or a second mode wherein the input-output system exchanges data with the central processing unit, said controller including:

a read only store having a plurality of addressable registers, an address means coupled to said read store for selecting a given addressable storage register, said read only store having a memory cycle equal to or less than the time duration of a machine cycle of said central processing unit, a read only store data register coupled to said read only store for receiving data signals from said read only store, said read only store responding to signals from said address means to read information from a selected one of the plurality of addressable registers to said read only store data register once during each central processing unit machine cycle, first means coupled to said read only store data register which responds to data signals in said read only store data register for generating timing and control signals which manipulate said data processing system, a back up register, first switch means coupled between said address means and said back up register which is operated each machine cycle to transfer the content of said address means to said back register, second switch means coupled between said address means and said back up register for selectively transferring the content of said back up register to said address means, said input-output system including means to generate a given signal whenever service is required.

second means coupled to said read only data register which responds to said given signal to force a predetermined code into the read only store data register, third means between said read only store and the read only store data register which responds to said given signal to prevent a transfer from the read only store to the ready only store data register, and fourth means responsive to said given signal which opens said first and second switch means thereby to preserve in said back up register the last address signals to the read only store during the machine cycle in which said given signal occurred, whereby in one central processing unit machine cycle said controller suspends processing by the central processing unit in said first mode and commences processing in said second mode to execute an input-output routine.

13. The apparatus of claim 12 wherein said input-output system is operated by channel control words from said controller, said controller including means to operate said central processing unit to perform updating operations on said channel control words concurrently with a data transfer in either direction between said central processing unit and said input-output system.

14. A controller for a data processing system including:
an addressable memory for storing instruction signals,
an address means coupled to said memory for selecting instruction signals,
an output register coupled to said memory fo rreceiving instruction signals from an address specified by said address means,
first means responsive to signals from said output register for generating and distributing control signals to said data processing system,
second means for generating a given signal whenever a change in an instruction program is required,
third means coupled to said output register and being responsive to said given signal to force a given instruction code into said output register, and
fourth means between said addressable memory and said output register and being responsive to said given signal to prevent a transfer of instruction signals from said memory to said output register, whereby a change from one instruction program to another may be initiated without intervening delay.

15. The apparatus of claim 14 further including a back up register,
fifth means coupling the back up register and the address means for transferring the content of either to the other, said fifth means serving to preserve the content of the address means in the back up register whenever a change is made from one instruction program to another by said third means.

16. The apparatus of claim 15 further including a central processing unit and an input-output system coupled to and operated by said controller.
said input-output system being connected to said second means, said input-output system serving to operate said second means and change from one instruction program to an input-output instruction program which permits data exchanges between the central processing unit and the input-output system.

17. The apparatus of claim 16 wherein said central processing unit includes addressable storage means, an arithmetic device, logic circuits, and data paths and registers for transferring and processing data,
said first means including further means to store the content of only one designated register of the central processing unit in said storage means during an input-output instruction program,
said controller including additional means to operate the central processing unit to perform housekeeping operations on control data for the input-output system by using said designated register, without reservation, and by using at least one other register on a temporary basis while its content is temporarily placed in the storage means at addresses briefly vacated by the data on which the housekeeping operations are performed.

18. The apparatus of claim 16 wherein said first means includes sampling means which interrogates said input-output system to determine if additional data exchanges are ready to be made and if further such exchanges are required, said second means is operated successively by the input-out system to execute a series of independent input-output instruction programs in chained fashion with a minimum or no intervening time delay therebetween,
said first means responding to the last instruction in an input-output instruction program, where no further signals are supplied by said second means, to restore the content of said one designated register in the central processing unit and to operate the fourth means to restore the content of said back up register to said address register, thereby to revert back to said one instruction from said input-output instruction program.

19. The apparatus of claim 17 wherein the central processing unit includes an addressable main store having a cycle of operation which includes a first portion for reading information therefrom and a second portion for writing information therein, and additional control means disposed between said main store and said second means which inhibits the operation of said second means during a given period in the first portion of the cycle of operation of said main store.

20. In a data processing system in which a central processing unit of registers and logic circuits is operated cyclically in coordination with a plurality of storage units including a main store, a local store and a control store, said stores having differently timed cycles and phases of operation relative to each other and to the cycles of said processing unit, an improved Break-in system for interrupting and utilizing the logic circuits of said central processing unit for input-output signal transfer operations relative to said storage units, comprising:
a source of Break-in request signals;
first control means conditionally responsive to each request signal from said source to control the registers and logic circuits of said central processing unit to carry out operations incidental to an input-output transfer relative to one of said storage units and to initiate in parallel all operations required to prepare the registers of said central processing unit to participate in said transfer, within a fraction of a cycle of operation of said central processing unit, and second control means coupled to said first control means which conditions said first control means to initiate its response only when said main store is in other than a predetermined early phase of its plural phase operating cycle.

21. The Break-in system of claim 20 wherein said first means includes means for storing the content of a single one of said registers of said central processing unit in a specifically allocated location in said local store, within a said fraction of a cycle of operation of said central processing unit, as one of the said preparatory operations.

22. A Break-in system as defined in claim 20 in which additional circuits for performing said preparatory operations performed by said conditionally responsive first means within a said fraction of a cycle include: third means for suppression of the next sequential control word output of said control store, fourth means for substitution therefor of a predetermined control word, fifth means for preservation of the control store address of the suppressed control word in a specific register, and sixth means for storage of the content of a single one of said registers of said central processing unit in a specific location in said local store.

References Cited

UNITED STATES PATENTS

| | | | |
|---|---|---|---|
| 3,290,655 | 12/1966 | Abernathy | 340—172.5 |
| 3,293,610 | 12/1966 | Epperson et al. | 340—172.5 |
| 3,297,999 | 1/1967 | Shimabukuro | 340—172.5 |
| 3,302,177 | 1/1967 | Bina | 340—172.5 |
| 3,348,211 | 10/1967 | Ghiron | 340—172.5 |
| 3,359,544 | 12/1967 | Macon et al. | 340—172.5 |
| 3,373,408 | 3/1968 | Ling | 340—172.5 |
| 3,377,619 | 4/1968 | Marsh et al. | 340—172.5 |

ROBERT C. BAILEY, *Primary Examiner.*

JOHN P. VANDENBURG, *Assistant Examiner.*

PO-1050
(5/69)

UNITED STATES PATENT OFFICE
CERTIFICATE OF CORRECTION

Patent No. 3,453,600           Dated July 1, 1969

Inventor(s)     Thomas S. Stafford et al

It is certified that error appears in the above-identified patent and that said Letters Patent are hereby corrected as shown below:

Claim 10, Col. 31, Line 53 change "opening" to ---operating---.
                     Line 54 change "ready" to ---read---.

Claim 12, Col. 32, Line 42 after "input-output" insert ---system---.
                     Line 52 after "read" insert ---only---.
                     Line 73 after "back" insert ---up---.

Col. 33, Line 5 after "only" insert ---store---.
                     Line 11 change "ready" to ---read---.
                     Line 15 after "signals" insert ---supplied---.

SIGNED AND SEALED

MAY 12 1970

(SEAL)
Attest:

Edward M. Fletcher, Jr.
Attesting Officer

WILLIAM E. SCHUYLER, JR.
Commissioner of Patents